United States Patent [19]
Nakaya et al.

[11] Patent Number: 5,978,830
[45] Date of Patent: Nov. 2, 1999

[54] MULTIPLE PARALLEL-JOB SCHEDULING METHOD AND APPARATUS

[75] Inventors: Akihiro Nakaya, Tokyo; Takashi Nishikado, Ebina; Hiroyuki Kumazaki, Yokohama; Naonobu Sukegawa, Hadano; Kei Nakajima, Chigasaki; Masakazu Fukagawa, Hadano, all of Japan

[73] Assignee: Hitachi, Ltd., Tokyo, Japan

[21] Appl. No.: 09/028,351

[22] Filed: Feb. 24, 1998

[30] Foreign Application Priority Data

Feb. 24, 1997 [JP] Japan .................................. 9-038903

[51] Int. Cl.⁶ ..................................................... G06F 9/00
[52] U.S. Cl. ........................................... 709/102; 709/103
[58] Field of Search ..................................... 709/100, 101, 709/102, 103, 104, 107

[56] References Cited

U.S. PATENT DOCUMENTS

| | | | |
|---|---|---|---|
| 5,127,092 | 6/1992 | Gupta et al. . | |
| 5,317,734 | 5/1994 | Gupta ........................ | 395/706 |
| 5,652,871 | 7/1997 | Steinman et al. ............... | 395/500 |
| 5,721,827 | 2/1998 | Logan et al. ................... | 709/217 |
| 5,781,762 | 7/1998 | Steinman et al. ............... | 395/500 |
| 5,781,775 | 7/1998 | Ueno ........................ | 709/102 |

OTHER PUBLICATIONS

H. J. Patric, Computer Architecture and Organization, McGraw–Hill Book Co., 1988, pp. 626–629.
H. Kai, Advanced Computer Architecture: Parallelism, Scalability, Programmability–Multiprocessors and Multicomputers, McGraw–Hill Book Co., 1993, pp. 364–367.
U.S. Patent No. 4,809,157.

*Primary Examiner*—Majid A. Banankhah
*Attorney, Agent, or Firm*—Antonelli, Terry, Stout & Krauss, LLP

[57] ABSTRACT

Multiple parallel-job scheduling method and apparatus are provided which can improve the utilization of all processors in a system when a plurality of parallel jobs are executed concurrently. A plurality of processors constituting a computer system and each having the equal function are logically categorized into serial processors for executing a serial computing part or a parallel computing part of a parallel job and a parallel processor group consisting of multiple processors for executing the parallel computing part of the parallel job in parallel. In order that the parallel processors are shared by a plurality of parallel jobs, a synchronization range indicator is provided which can control by program whether the parallel processors are available in correspondence to the respective serial processors. In response to a request for using the parallel processors from a serial processor for which the parallel processors are so set as to be available by means of the synchronization range indicator, operation can be carried out without invoking an interrupt.

10 Claims, 22 Drawing Sheets

FIG.5

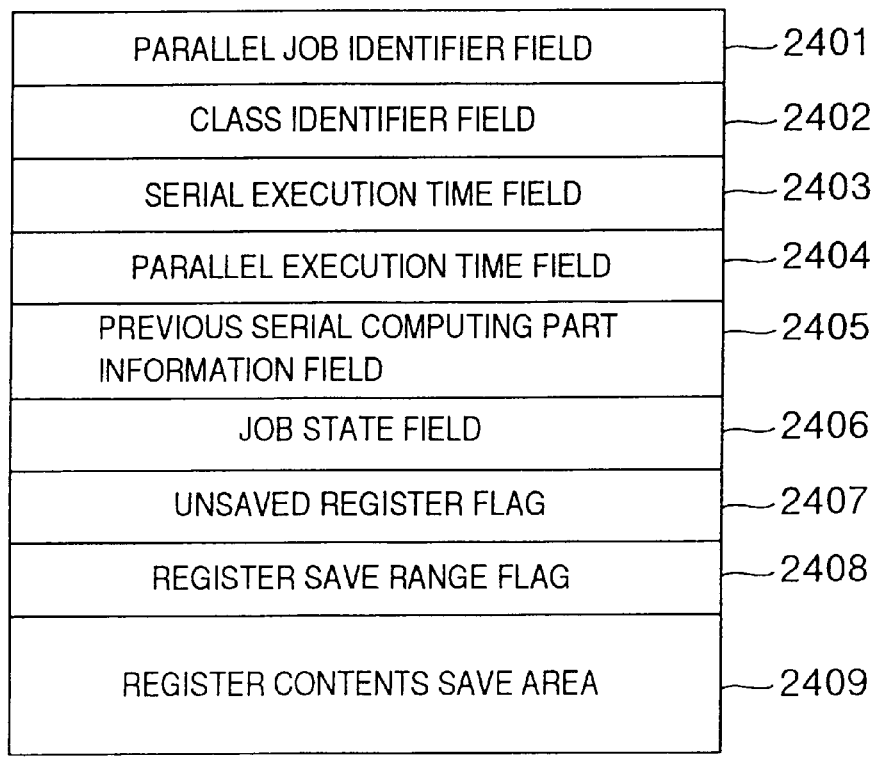

- PARALLEL JOB IDENTIFIER FIELD — 2401
- CLASS IDENTIFIER FIELD — 2402
- SERIAL EXECUTION TIME FIELD — 2403
- PARALLEL EXECUTION TIME FIELD — 2404
- PREVIOUS SERIAL COMPUTING PART INFORMATION FIELD — 2405
- JOB STATE FIELD — 2406
- UNSAVED REGISTER FLAG — 2407
- REGISTER SAVE RANGE FLAG — 2408
- REGISTER CONTENTS SAVE AREA — 2409

FIG.6

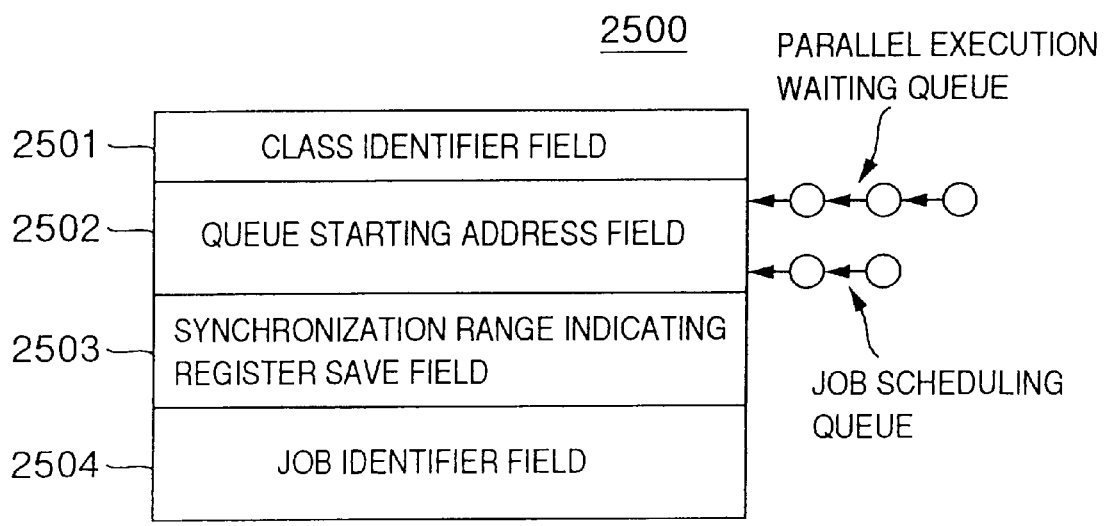

2500

- 2501 — CLASS IDENTIFIER FIELD
- 2502 — QUEUE STARTING ADDRESS FIELD
- 2503 — SYNCHRONIZATION RANGE INDICATING REGISTER SAVE FIELD
- 2504 — JOB IDENTIFIER FIELD

PARALLEL EXECUTION WAITING QUEUE

JOB SCHEDULING QUEUE

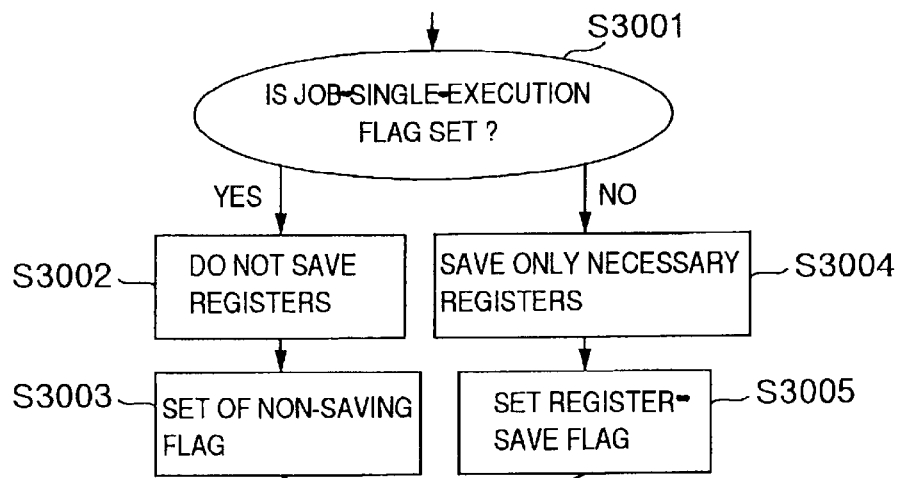
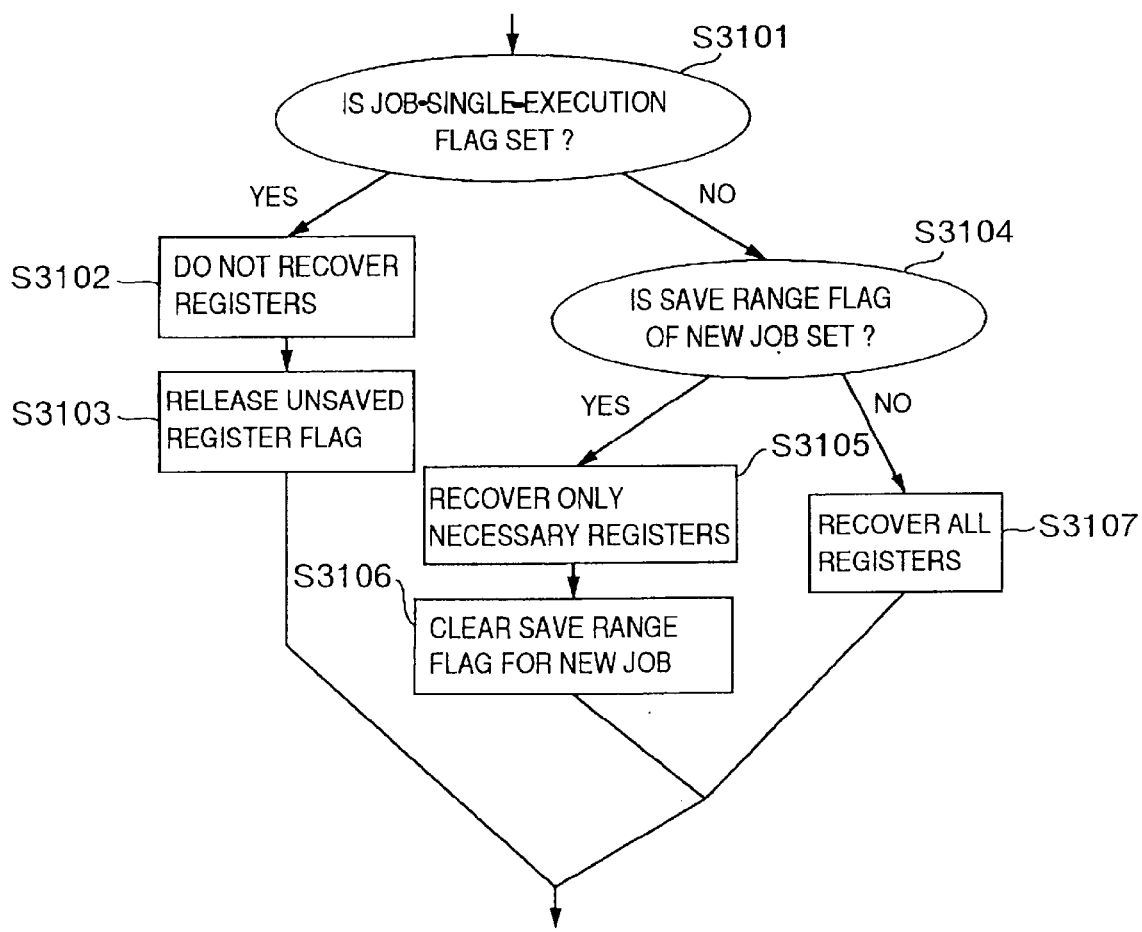

MULTIPLE PARALLEL-JOB SCHEDULING METHOD AND APPARATUS

BACKGROUND OF THE INVENTION

The present invention relates to multiple parallel-job scheduling method and apparatus and more particularly, to a multiple parallel-job scheduling method and apparatus suitable for parallel or concurrent execution of a plurality of parallel information processing programs.

Hayes, John Patrick, "Computer Architecture and Organization", McGraw-Hill Book Co., 1988, pp. 626–629 discloses a parallel-job executing system in which processors consisting of serial processors and parallel processors are used and when a plurality of information processing programs are processed in parallel, the processors are utilized in a time sharing manner.

Hwang Kai, "Advanced Computer Architecture: Parallelism, Scalability, Programmability-Multiprocessors and Multicomputers", McGraw-Hill Book Co., 1993, pp. 364–367 discloses barrier synchronization. U.S. Pat. No. 4,809,157 discloses a technique of dynamically assigning a plurality of jobs to a plurality of processors.

In the conventional systems, however, when a plurality of parallel jobs are executed, parallel processors and serial processors in the processors are handled collectively and utilized in a time sharing fashion to perform the parallel computation, with the result that when the processors are assigned to one parallel job and a serial computing part of the parallel job is executed within a time for the assignment, the parallel processors are placed in idle condition, raising a problem that the utilization of the whole of the computer system is degraded.

In a system called a dual scalar processor system, two serial computing components are prepared, a single parallel computing component is shared by the two serial computing components and the parallel computing component is also utilized in a time sharing manner, thus raising a problem that the parallel computing component is idled during the execution of the serial computing component and the utilization of the whole of the computer system is degraded.

SUMMARY OF THE INVENTION

An object of the present invention is to provide multiple parallel job scheduling method and apparatus which can improve the utilization of all processors in a system when a plurality of parallel jobs are executed concurrently.

To accomplish the above object, according to the present invention, there is provided a scheduling method of performing scheduling of execution of a plurality of jobs each including a serial computing part and a parallel computing part in a system having a plurality of processors, comprising the steps of:

indicating, within said plurality of processors, a first serial processor for executing a serial computing part and a parallel computing part of a first job and a plurality of first parallel processors for executing the parallel computing part of said first job in parallel, said plurality of parallel processors including said first serial processor;

indicating, within said plurality of processors, a second serial processor, other than said first serial processor, for executing a serial computing part and a parallel computing part of a second job executed in parallel with said first job and a plurality of second parallel processors for executing the parallel computing part of said second job, said plurality of second parallel processors including said second serial processor and at least one of said plurality of first parallel processors; and scheduling the execution of jobs such that during the execution of said parallel computing part of said first job in said plurality of first parallel processors, said serial computing part of said second job in said second serial processor is executed.

It is possible to generate an interrupt signal during the execution of said first job when said second serial processor issues a request for using said plurality of second processors in order to execute said parallel computing part of said second job, and, after the generation of said interrupt, suspending the execution of said parallel computing part of said second job during the execution of said parallel computing part of said first job by said plurality of first parallel processors. When a predetermined job scheduling event occurs, it is possible to forbid the execution of said parallel computing part of said first job by said first parallel processor in order to permit the execution of said parallel computing part of said suspended second job, and to permit, when said predetermined scheduling event occurs, the execution of said parallel computing part of said suspended second job and executing said parallel computing part of said second job in said plurality of second parallel processors. Above mentioned method may include the steps of:

issuing a termination notice when the execution of said parallel computing part of said first job in said plurality of first parallel processors is terminated;

detecting that the executing time of a serial computing part in any of the processors which succeeds the termination of the execution of said parallel computing part of said first job in said plurality of first parallel processors is greatly longer than the executing time of a parallel computing part of a suspended job;

notifying in response to the detection in said detecting step to provide a job switching signal as said predetermined job scheduling event; and after the execution of said parallel computing part of said first job, resuming the execution of said serial computing part of said first job in said any of the processors.

In another aspect of the invention, there is provided a scheduling method for scheduling for the purpose of executing a plurality of jobs each including a serial computing part and a parallel computing part in a system having a plurality of processors, comprising the steps of:

indicating, in said plurality of processors, a first serial processor for executing a serial computing part and a parallel computing part of a first job and a plurality of first parallel processors for executing the parallel computing part of said first job in parallel, said plurality of first parallel processors including said first serial processor;

indicating, in said plurality of processors, a second serial processor, other than said first serial processor, for executing a serial computing part and a parallel computing part of a second job which are executed in parallel with said first job and a plurality of second parallel processors for executing a parallel computing part of said second job, said plurality of second parallel processors including said second serial processor and at least one of said plurality of first parallel processors;

waiting for synchronization before the execution of said parallel computing part of said first job in said plurality of first parallel processors is started;

when said plurality of first serial processors terminate the execution of said parallel computing part of said first job, executing a synchronization instruction; and when the execution of said parallel computing part of said first job in said plurality of first parallel processors is terminated, issuing a synchronization instruction to permit the execution of said parallel computing part of said second job in said plurality of second serial processors.

(1) In addition, from another aspect of the present invention, a plurality of processors constituting a computer system and being equally functional to each other are logically categorized into a plurality of serial processors for executing a serial computing part or a parallel computing part of a parallel job and at least one group of parallel processors for executing a parallel computing part of the parallel job in a parallel way, each of the serial processors being dedicated to one of a plurality of jobs, the parallel processors can be shared by a plurality of serial processors, and during an interval of time, only one serial processor is allowed to use the parallel processors.

With the above method, the plurality of jobs can be executed in parallel and hence, the utilization of all processors in the computer system can be improved. The above operations are executed by a scheduler in the OS of the system.

(2) In the above (1), preferably, at the timing of an interrupt due to a request for use of the parallel processors from a second serial processor which is generated during execution of a first job by a first serial processor, the scheduler places a second parallel job in execution waiting condition, the parallel job in waiting condition is taken out at the succeeding job scheduling event based on a predetermined rule, the parallel processors are inhibited from execution by the frist serial processor to allow the parallel processors to be used by the second serial processor corresponding to the taken-out parallel job.

With this method, the overhead of job switching can be reduced.

(3) In the above (2), preferably, the job scheduling event is a termination notice which is notified when the parallel job executed on the parallel processors terminates instructions in a parallel computing part. With this method, switching of less overhead can be accomplished.

(4) In the above (2), preferably, the job scheduling event is a parallel computing part termination notice which is issued when a compiler determines that the executing time of a serial computing part succeeding one parallel computing part is longer than a constant time or when the user indicates the issuance in a program.

With the above method, the overhead of scheduling can be reduced and the utilization of the whole of the computer system can be improved.

(5) In the above (2), preferably, the job scheduling event occurs when all processors which are about to be applied with synchronization are so set as to be placed in waiting condition for system call processing.

With this method, switching of less overhead can be accomplished.

(6) In the above (2), preferably, the job scheduling event is a termination notice of a parallel computing part in execution which is issued when the computing time required for execution of a serial computing part between a parallel computing part and the succeeding parallel computing part is statistically recorded and it is decided that there is a high possibility that a serial computing part about to be executed has a longer time than the statistical time.

With this method, the assignment of the parallel processors can be changed by dynamically issuing the termination notice.

(7) In the above (2), preferably, only the contents of as small a number of registers as possible of registers used by a first job executed by respective parallel processors is saved and the contents of registers which has been saved in correspondence to a second parallel job using the parallel processors is recovered to resume the execution of the second parallel job.

With this method, the number of registers to be saved/recovered can be reduced greatly and the overhead of job switching can be reduced.

(8) In the above (1), preferably, in the plurality of processors, the ratio of the number of processors assigned for the serial processors to the number of processors assigned for the parallel processors is changed dynamically.

With this method, the utilization of the computer system can be increased.

(9) In the above (8), preferably, parallel jobs are classified in accordance with the number ratio of processors used, only parallel jobs belonging to the same class are subjected to scheduling during an interval of time, classes to which the parallel jobs belong are indicated by the user when the parallel jobs are started in the computer system, classes to be processed are switched in accordance with the indication and the number ratio of processors in the computer system is changed dynamically concomitantly with the class switching.

With this method, jobs belonging to classes can be processed in accordance with execution systems of the respective classes within times assigned to the respective classes.

(10) In the above (1), preferably, before a parallel computing part of a job is processed by the parallel processors, synchronization of processors constituting the parallel processors is made, the maximum waiting time for completion of the synchronization is indicated, and when all processors which are so indicated as to be within the synchronization range do not reach the synchronization point within the indicated time, scheduling of the next job is started.

With this method, the synchronization is determined to be failed, an interrupt for informing the synchronization failure is generated on the processor, and responsive to the generation, the scheduler is invoked and the error processing can be carried out.

(11) To accomplish the above object, an apparatus according to the present invention comprises a plurality of processors which are equally functional to each other and which are logically categorized into serial processors for executing a serial computing part or a parallel computing part of a parallel job and parallel processor groups for executing a parallel computing part of the parallel job, and a parallel processor affinity indicator which can control by program whether the parallel processors are available in correspondence to each serial processor in order that the parallel processors are shared by the plurality of jobs, the operation is allowed without invoking interrupt for a request for use of the parallel processors from a serial processor so set by the parallel processor affinity indicator that the parallel processors are available for this serial processor, and an interrupt is generated to a serial processor in response to a request for use of the parallel processors from the serial processor so set by the parallel processor affinity indicator that the parallel processors are not available for this serial processor.

With this construction, a plurality of jobs can be executed in parallel and therefore the utilization of all the processors in the computer system can be improved.

(12) In the above (11), preferably, the parallel processor affinity indicator is a synchronization range indicator which can indicate by program the range of the processors to be synchronized and is a barrier synchronizer in which when all processors within the synchronization range issue synchronization requests, the establishment of the synchronization is informed to each of the processors and each processor detects the synchronization establishment.

With this construction, the assignment of the parallel processors can be changed at a high speed.

(13) In the above (12), preferably, the synchronization range indicator includes an n-bit register corresponding to n processors, the bits are assigned to the n processors bit by bit, and "1" is set to a bit corresponding to a processor participating in the synchronization to determine the range of the synchronization in accordance with the contents of the register.

With this construction, by causing a synchronization point arrival instruction executed upon invocation of a parallel computing part to examine a bit of the register in the synchronization range indicator corresponding to a processor which has executed the instruction, the processing can be carried out easily in accordance with the modes as to whether this processor can use the parallel processors.

(14) In the above (11), preferably, the parallel processor affinity indicator includes synchronization point arrival flags provided corresponding to the respective processors on a memory, a processor reaching the synchronization point makes a synchronization request by setting the synchronization point arrival flag, the completion of the synchronization is detected in a software fashion at the time that the synchronization flags of all the processors are set, a synchronization range indicating field is provided on the memory, and the indication of the synchronization range is carried out in software fashion by registering a processor within the synchronization range on the synchronization range indicating field.

With this construction, the synchronization among the processors can be realized in software fashion.

(15) In the above (11), preferably, interserial/parallel processor data transfer areas for data transfer between the serial processor and the parallel processors are provided in a real address space by the number of parallel jobs subject to multiple execution, the areas are mapped to the same virtual addresses of the parallel jobs, and upon scheduling, the mapping is switched to an inter-serial/parallel processor data transfer area corresponding to a job subsequently executed by the respective processors.

With this construction, the state of the interprocessor data transfer areas need not be saved/recovered and the assignment of the parallel computing component can be changed at a high speed.

(16) In the above (11), preferably, a plurality of serial processors and a plurality of parallel processor groups are provided, parallel processor affinity fields for indicating/controlling the affinity between the serial processors and the parallel processor groups are provided by the number of all the processors, a serial processor assigned with a parallel processor group sets a processor identifier of its own in a parallel processor affinity field of its own and a parallel processor sets a processor identifier of an assignment destination serial processor in the parallel processor affinity field to thereby indicate a plurality of combinations of the serial processors and the parallel processor groups.

With this construction, a plurality of parallel processes can be executed.

BRIEF DESCRIPTION OF THE DRAWINGS

FIG. 5 is a diagram showing the structure of job control data used in an embodiment of the present invention.

FIG. 6 is a diagram showing the structure of class control data used in an embodiment of the present invention.

FIG. 30 is a flow chart showing the operation at the time that the register is saved when a single job is executed in the multiple parallel-job scheduling method according to an embodiment of the present invention.

FIG. 31 is a flow chart showing the operation at the time that the register is recovered when the single job is executed in the multiple parallel-job scheduling method according to an embodiment of the present invention.

DESCRIPTION OF THE PREFERRED EMBODIMENTS

Referring now to FIGS. 1 to 31, multiple parallel-job scheduling method and apparatus according to an embodiment of the present invention will be described.

Firstly, the construction of a computer system in the embodiment of the present invention will be described with reference to FIG. 1.

Figure 1:
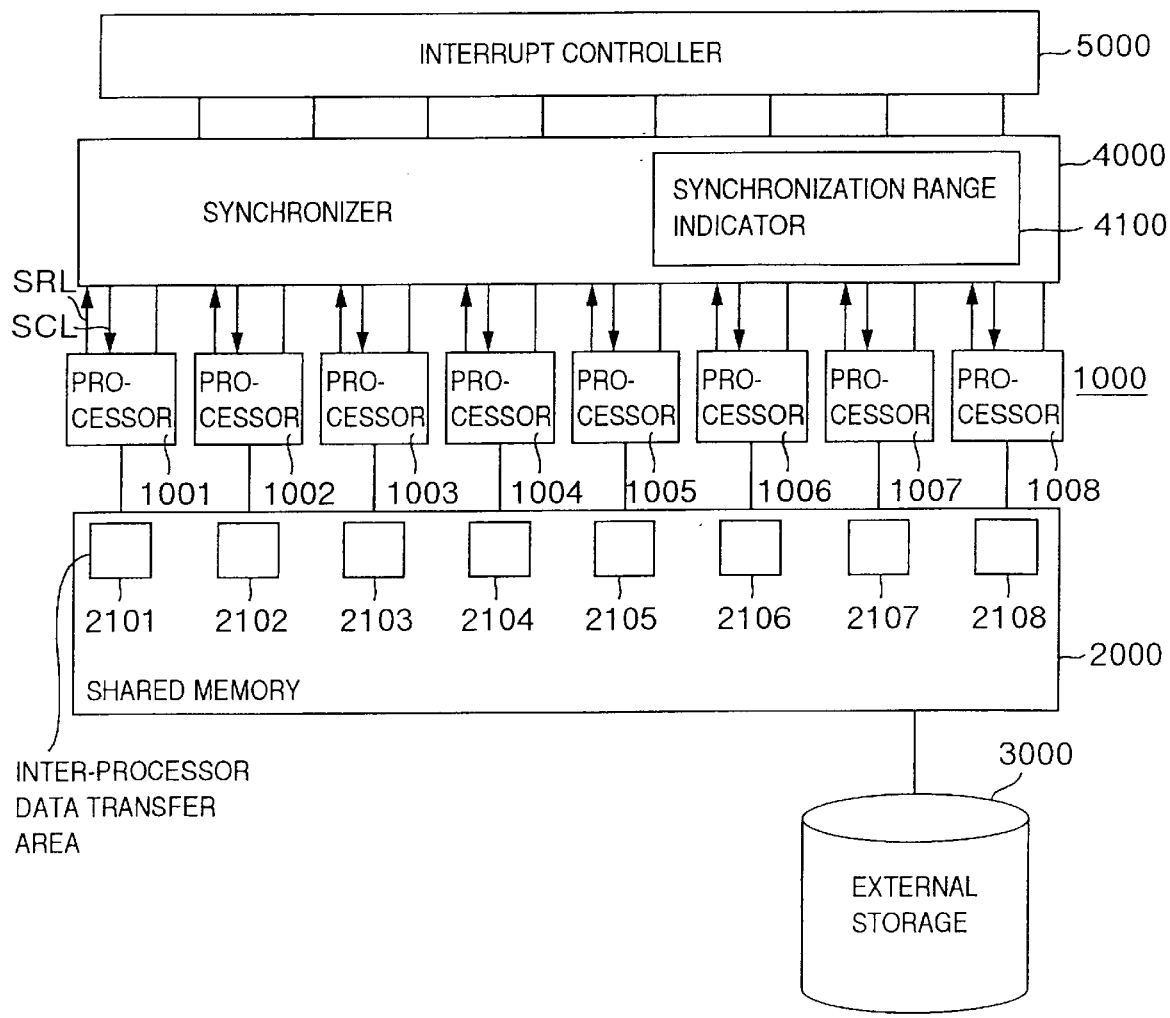
FIG. 1 is a diagram showing the overall construction of a computer system according to an embodiment of the present invention.

The overall construction of the computer system in the embodiment of the present invention is shown, in block form, in FIG. 1.

A group of processors, generally designated by reference numeral 1000, includes, for example, eight processors 1001 to 1008. The number of the processors is eight herein but is not limitative. The processors 1001 to 1008 are each connected to a shared memory 2000 to read/write data. The shared memory 2000 has areas 2101 to 2108 for data transfer among processors (hereinafter simply referred to as inter-processor data transfer areas 2101 to 2108). Data is transferred among the processors 1001 to 1008 through the inter-processor data transfer areas 2101 to 2108. For example, in order to send data from an originator processor 1001 to a receiver processor 1002, the originator processor 1001 writes the data into the data transfer area 2102 of the receiver processor the receiver processor 1002 makes reference to the data. A program code of a user is stored in an external storage 3000 and before execution, the code is loaded on the shared memory and executed.

In the present embodiment, the respective processors 1001 to 1008 of the processor group 1000 have the equal computing function. The processor for execution of a serial computing part and a parallel computing part of a parallel job is called a serial processor during the execution of the job. The processor for execution of only the parallel computing part is called a parallel processor during the execution of the job. In other words, the processor group 1000 is logically categorized into multiple serial processors and multiple parallel processors.

The multiple parallel processors constituting a group of parallel processors execute a parallel computing part of the job in a parallel way and thereafter, a set of the parallel processors is called a parallel processor group. The multiple parallel processor group is assigned to different parallel jobs in a time sharing manner, respectively. On the other hand, each of the multiple serial processors is dedicated to one of the parallel jobs and independently executes the serial computing part of the job. One of the multiple serial processors executes a process of the parallel computing part of the job in parallel with the multiple parallel processors constituting the parallel processor group.

It is now assumed that in the present embodiment, the processor group is logically categorized during a certain interval of time in such a manner that, for example, the processors 1001 to 1004 constitute or behave as multiple serial processors and the processors 1005 to 1008 constitute or behave as parallel processors. The ratio of the number of serial processors to that of parallel processors can be arbitrarily defined and for example, the processor group may be logically categorized in such a manner that the processors 1001 and 1002 constitute or behave as multiple serial processors and the processors 1003 to 1008 constitute or behave as parallel processors. The number of the parallel processor group is not limited to one. For example, the processors 1003 to 1005 may constitute a first group of parallel processors and the processors 1006 to 1008 may constitute a second group of parallel processors. When a plurality of groups are provided as above, the plurality of parallel processor groups may be used in parallel to execute respective parallel computing parts. An operating system (OS) may be provided in a dedicated processor (for example, 1008) or may be provided in any of the processors 1001 to 1008, as necessary, and the system may be operated by using an OS execution code in the shared memory 2000.

A synchronizer 4000 for processors is connected to the processors 1001 to 1008 to execute synchronous control among the processors 1001 to 1008 under the control of barrier synchronization. The processor synchronizer 4000 includes a synchronization range indicator 4100. The synchronization range indicator 4100 indicate a combination of a serial processor and a parallel processor group to assign individual multiple parallel jobs to the parallel processor group so that the parallel processor group may be used commonly for the parallel jobs. Multiple processors, the number of which is indicated by the synchronization range indicator 4100 so as to be suitable for a job, can be allowed to perform synchronization under the direction of the OS in the computer system. The synchronization range indicator 4100 will be detailed later with reference to FIG. 2.

It is important that unlike the conventional parallel machine, the processing component which executes parallel computing parts in the present invention is logically constructed of multiple processors which are equally functional to serial processors. Through this, the ratio of the number of the processors assigned for serial processors to the number of processors assigned for parallel processors can be changed. Further, the number of the physical processors can be increased as necessary to improve the operation performance.

Each of the processors 1001 to 1008 is connected to the processor synchronizer 4000 by a synchronization point arrival signal line SRL and a synchronization completion signal line SCL. During the synchronization, one processor in the processor group 1000 which reaches synchronization delivers a signal to the synchronization point arrival line SRL by executing a synchronization point arrival instruction and executes a synchronization completion waiting instruction to wait for arrival of a signal from the synchronization completion signal line SCL. The processor synchronizer 4000 determines that preparation for synchronization is completed at the time that all processors which are so indicated as to be in the range of synchronization by means of the synchronization range indicator 4100 deliver signals to the synchronization arrival point signal lines SRL, and delivers signals to the synchronization completion signal lines SCL of the processors within the synchronization range to notify these processor of the completion of the preparation for synchronization. Receiving the signals, the processors are released from synchronization completion waiting states and allowed to proceed to execution of the succeeding operation.

An interrupt controller 5000 for processors is connected to the synchronizer 4000 for processors and responds to a synchronization request from a processor which is so indicated as to be outside the synchronization range by means of the synchronization range indicator 4100 to cause this processor to generate an interrupt to thereby invoke a scheduler in the shared memory 2000, with the result that a processor assignment waiting state can be established. When a processor which has been so set as to be in the synchronization range by means of the synchronization range indicator 4100 makes a synchronization request and the processor is so reset as to be outside the synchronization range before the synchronization is established, this processor can be caused to generate an interrupt to thereby invoke the scheduler.

Figure 2:
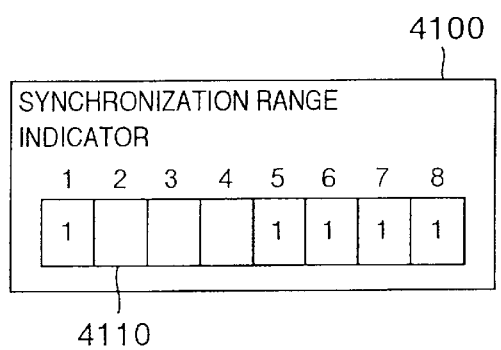
FIG. 2 is a diagram showing the structure of a synchronization range indicator according to an embodiment of the present invention.

Referring now to FIG. 2, an embodiment of the synchronization range indicator 4100 used in the computer system will be described.

The synchronization range indicator has a structure as shown in FIG. 2.

When the computer system is comprised of the eight processors as has been explained in connection with FIG. 1, the synchronization range indicator 4100 includes a synchronization range indicating register 4110 of 8 bits.

Generally, in a computer system comprised of n processors, processors participating in the synchronization processing are indicated by an n-bit register (synchronization range indicating register) included in the synchronization range indicator. A k-th bit in this register corresponds to a k-th processor and if "1" is set in this bit, the corresponding processor participates in the synchronization. Responsive to a synchronization request from a processor which is so indicated as to be in the synchronization range, the synchronization keeps continuing without alteration.

On the other hand, when a synchronization request is made from a processor which is so indicated as to be outside the synchronization range, this processor is caused to generate an interrupt to thereby invoke the scheduler. When the processor which has been so indicated as to be in the synchronization range makes a synchronization request but is so reset as to be outside the synchronization range before the synchronization is established, this processor is also caused to generate an interrupt to thereby invoke the scheduler.

It is important herein that a synchronization request from a processor being outside the synchronization range is not neglected but responsive to the synchronization request, an interrupt is generated on the requester processor and that an interrupt is generated on a processor which is so reset as to be outside the synchronization range before the synchronization is established.

In an example shown in FIG. 2, "1" is set in bits 1, 5, 6, 7 and 8 of the synchronization range indicating register 4110 of 8 bits to instruct the processors 1001, 1005, 1006, 1007 and 1008 of the eight processors shown in FIG. 1 to participate in the synchronization, on the assumption that at the start time of the system, the OS designates the processor 1001 as a serial processor and the processors 1005 to 1008 as parallel processors constituting the parallel processor group. When the processors 1005 to 1008 execute a parallel computing part of a job, the processor 1001 also executes the parallel computing parts. At any other time, the processor 1001 executes a serial computing part.

Figure 3:
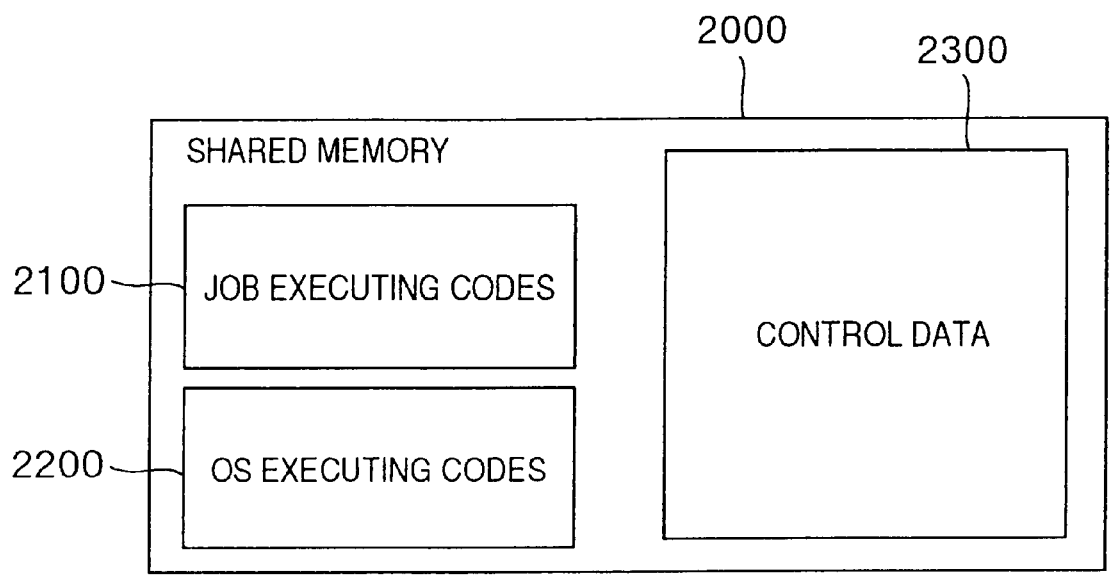
FIG. 3 is a diagram for explaining data prepared in a shared memory according to an embodiment of the present invention.

Referring now to FIG. 3, data prepared in the shared memory 2000 will be described. FIG. 3 is useful to explain data prepared in the shared memory according to an embodiment of the present invention.

In the shared memory 2000, job executing codes 2100 are arranged in correspondence to individual jobs and each of the processors 1001 to 1008 executes a job executing code 2100 assigned to its own. OS executing codes 2200 are arranged separately from the codes of user jobs. Control data 2300 for holding information necessary for controlling the jobs and hardware resource is allocated on the shared memory 2000.

Figure 4:
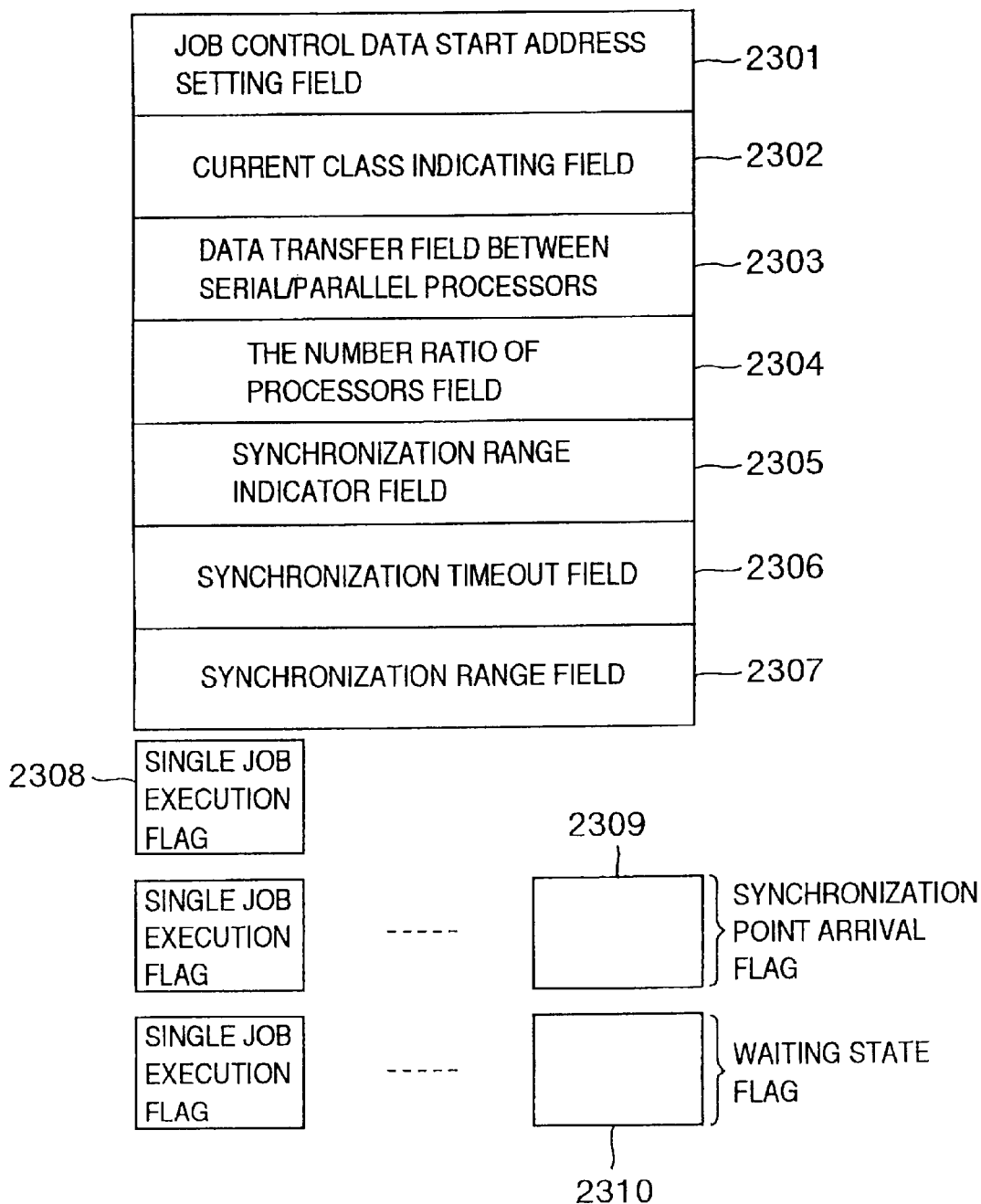
FIG. 4 is a diagram showing the structure of control data on the shared memory according to an embodiment of the present invention.

Turning now to FIG. 4, the contents of the control data 2300 allocated on the shared memory 2000 will be described. FIG. 4 shows a structure of the control data on the shared memory according to an embodiment of the present invention.

A field 2301 for setting a start address of data for controlling the job (hereinafter simply referred to as job control data start address setting field 2301) is an area which holds a memory address indicating where the job control data exists. When the user executing jobs are invoked, job control data 2400 as shown in FIG. 5 is allocated for every job on the shared memory 2000 and the user executing jobs are controlled on the basis of the job control data 2400.

A class indicating field 2302 is a field for setting a class of a job. A field 2303 which indicates assignment information of areas for data transfer between serial processors and parallel processors (hereinafter simply referred to as inter-serial/parallel processor data transfer area assignment field 2303) will be described later with reference to FIG. 13. A field 2304 which indicates the ratio of the number of processors assigned for serial processors to the number of processors assigned for the parallel processors (hereinafter simply referred to as processor number ratio setting field 2304) is used for switching the class, that is, changing the indicated number ratio of processors in the system on the basis of the data held in the field 2304 and will be detailed later with reference to FIG. 22. A field 2305 which indicates the contents of the synchronization range indicator (hereinafter simply referred to as synchronization rang indicator setting field 2305) is set to designate the contents of the synchronization range indicating register 4110 (FIG. 2). A field 2306 which indicates the contents of the synchronization timeout register (hereinafter simply referred to as synchronization timeout register setting field 2306) is used to set a register (synchronization timeout register) for setting the time which has elapsed before a failure of the synchronization is determined. A synchronization range indicating field 2307 and a synchronization point arrival flag 2309 are used when the synchronization among the processors is made with software, as will be described later.

A flag 2308 which indicates that only a single job is executed in the computer system (hereinafter simply referred to as single job execution flag 2308) will be described later with reference to FIG. 30. A plurality of waiting state flags 2310 are provided, the number of which equals that of the processors, and will be detailed later.

Next, reference is made to FIG. 5 to explain the structure of the job control data 2400 secured on the shared memory 2000 to control the user executing job.

FIG. 5 shows the structure of the job control data according to an embodiment of the present invention.

A parallel job identifier field 2401 holds unique parallel job identifiers. A class identifier field 2402 is used to hold a job class to which the job belongs and will be detailed later. A serial execution time field 2403 is used to record the serial execution time beginning with the invocation of the job.

A parallel execution time field 2404 is used to record the parallel execution time beginning with the invocation of the job. A previous serial computing part information field 2405 is used to keep information of the previous serial computing part and will be detailed with reference to FIG. 29. A job state field 2406 is used to keep a job state, that is, a state of a job itself.

An unsaved register flag 2407 is used to indicate that the registers are not saved. A register save range flag 2408 is used to indicate the save range of the registers and will be detailed with reference to FIG. 12. A register contents save area 2409 is used to save the contents of the registers when job switching is carried out.

Turning now to FIG. 6, class control data 2500 allocated on the shared memory 2000 will be described.

FIG. 6 shows the structure of the class control data according to an embodiment of the present invention.

As will be described later, the jobs are classified and are executed by switching classes. Each class has class control data 2500 consisting of fields as shown in FIG. 6 on the shared memory 2000 and is controlled in accordance with the class control data 2500.

The class control data 2500 for each class includes a class identifier field 2501, a queue starting address field 2502, a synchronization range indicating register save field 2503 and a job identifier field 2504. These fields are held on the shared memory 2000.

While in the example shown in FIG. 1 the processor group 1000 is connected to the shared memory 2000, data may be transferred among the processors through message passing by means of a communication unit (not shown) provided in association with the processors.

In the present embodiment, it is important that the parallel computing component is logically constructed with the multiple processors equally functional to the serial processors and that the synchronization range indicator is provided to generate an interrupt in response to a synchronization request from a processor outside the synchronization range.

Figure 7:
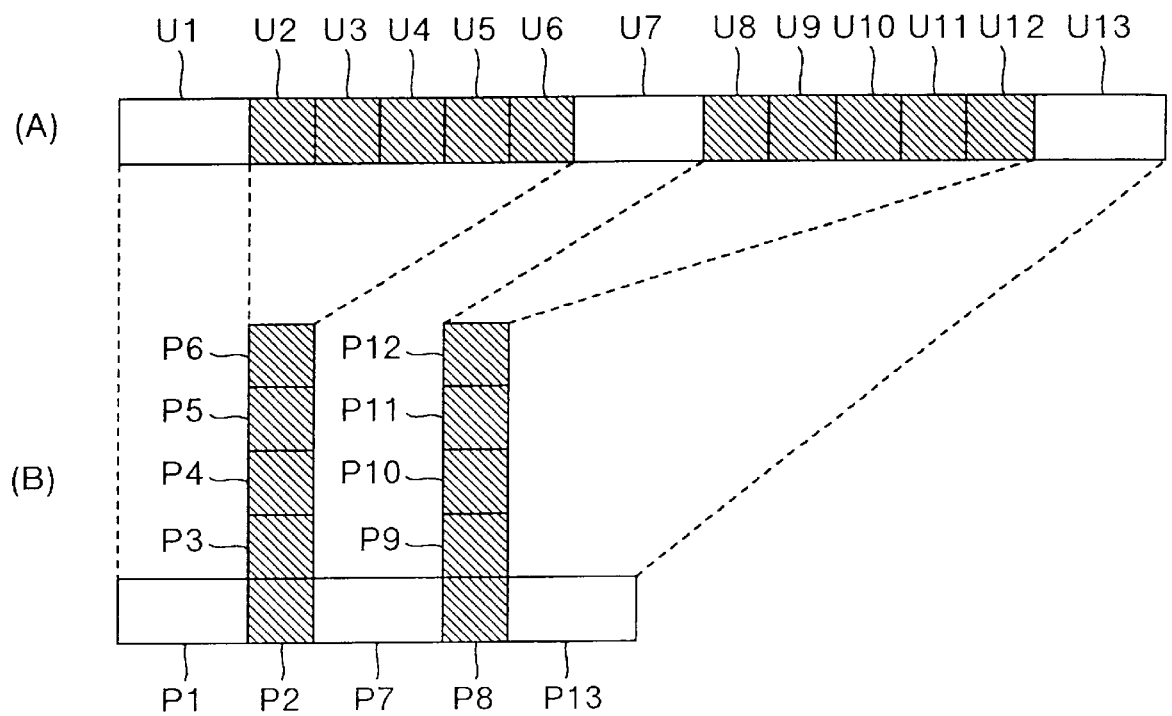
FIG. 7 is a schematic diagram of one system when a parallel job is executed using a plurality of processors according to an embodiment of the present invention.

Referring now to FIG. 7, the format of a parallel job to which the multiple parallel-job scheduling method of the present embodiment is applied will be described.

FIG. 7 schematically shows an embodiment of a method in which a parallel job is executed by using multiple processors.

In FIG. 7, rectangular portions U1 to U13 and rectangular portions P1 to P13 are depicted and each of the portions U1 to U13 represents a block of computing executed by an information processing program, with each of the portions P1 to P13 being also representative of a block of computing executed by the information processing program. Generally, the information processing program describes a sequence of instructions executed on the computer system and when the information processing program is executed by a computer system comprised of a single processor, the described sequence of instructions is executed sequentially. For example, when one information processing program describes a sequence consisting of computing instructions U1 to U13 as shown at (A) in FIG. 7, execution is carried out with the computer system comprised of the single processor in the order of from instruction U1 to instruction U13. Here, the time is so indicated as to flow from left to right in the illustration.

On the other hand, if the order of execution is arbitrary for, for example, 5 blocks of the instructions U2 to U6 of the instructions U1 to U13, these blocks are parallel computable parts which can be executed in parallel on a plurality of processors. Similarly, if the order of execution is arbitrary for 5 blocks of the instructions U8 to U12, these blocks are parallel computable parts which can be executed in parallel on a plurality of processors. The remaining instructions U1, U7 and U13 are serial computing parts.

Thus, in the present embodiment, the overall processing of the instructions U1 to U13 can be executed on 5 processors in charge of such instructions as the P1 to P13. Here, the instructions U2 to U6 representing the parallel computable parts can be handled as parallel computing parts and can be processed in parallel as indicated by the instructions P2 to P6. Similarly, the instructions U8 to U12 representing the parallel computable parts can be handled as parallel computing parts and executed as indicated by the instructions P8 to P12. The serial computing parts U1, U7 and U13 are handled as serial computing parts and executed as indicated by the instructions P1, P7 and P13. The illustration is drawn on the assumption that the time flows from left to right. Further, rectangles stacked vertically are depicted to indicate that they are executed in parallel on the different processors.

At (B) in FIG. 7, the instructions P3 to P6 and the instructions P9 to P12 are respectively executed by, for example, the parallel processors 1005 to 1008 constituting the parallel processor group shown in FIG. 1. The instructions P1, P7 and P13 representing the serial computing parts and the instructions P2 and P8 representing part of each of the parallel computing parts are executed by, for example, the serial processor 1001 which is one of the multiple serial processors shown in FIG. 1.

In the following description, similar denotations will be used for explanation.

Next, the outline of multiple execution of parallel jobs according to an embodiment of the present invention will be described with reference to FIG. 8.

Figure 8:
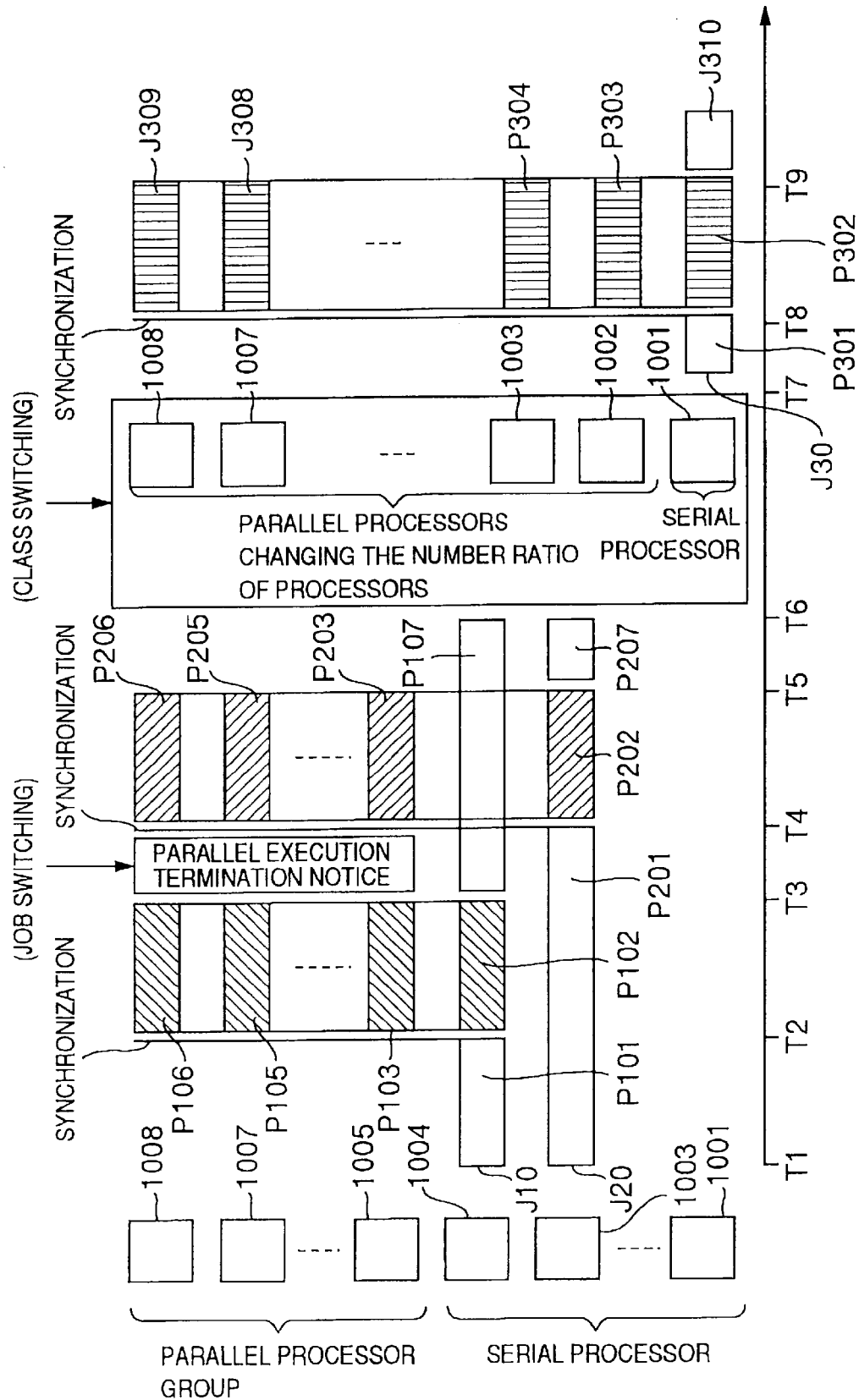
FIG. 8 is a diagram for explaining the outline of multiple execution of parallel jobs according to an embodiment of the present invention.

FIG. 8 is useful for explaining the outline of multiple execution of parallel jobs.

In particular, FIG. 8 diagrammatically outlines a method of assigning multiple processors to jobs and dynamically changing the number ratio of serial processors to parallel processors.

As described previously, the processors 1001 to 1008 are logically categorized into serial processors and parallel processors. It is now assumed that during an interval of from time T1 to time T6, the processors 1001 to 1004 constitute or behave as serial processors and the processors 1005 to 1008 constitute or behave as parallel processors. After time T6, only the processor 1001 behaves as a serial processor and the processors 1002 to 1008 behave as parallel processors.

First and second jobs J10 and J20 are parallel jobs being executed in parallel. The first job J10 is constructed of an instruction P101 which belongs to a serial computing part, instructions P102 to P106 which belong to a parallel computing part and an instruction P107 which belongs to a serial computing part. The second job J20 is constructed of an instruction 201 which belongs to a serial computing part, instructions P202 to P206 which belong to a parallel computing part and an instruction P207 which belongs to a serial computing part.

The parallel jobs J10 and J20 are generated by invoking a program obtained by causing the compiler to automatically translate a source program written by the user to a parallel program and to compile it. Depending on an option during compiling, the compiler generates an object in which the number of parallel processors is fixed or an object in which the number of parallel processors is variable. The object in which the number of parallel processors is fixed can be executed in only a class of the same construction as the parallel processor number indicated in the object file. It is now assumed that in the objects of the jobs J10 and J20, the number of parallel processors is fixed to 4. It is also assumed that in the object of the job J30, the number of parallel processors is variable. Then, the object of the job J10 is executable in a class in which the parallel processor number is 4. When the class in which the parallel processor number is 4 and a class in which the parallel processor number is 7 are operated in a time sharing fashion as shown in FIG. 8, the job J10 is operated during a time assigned to the class in which the parallel processor number is 4. In the case of the object in which the parallel processor number is variable, this object is executable in any class provided that the number ratio of processors is not permitted to be changed during the execution.

An object compiled by the compiler is executed by the OS. Upon start of the execution, the OS examines the object and starts the execution of this object in the case of the number of parallel processors number being fixed if a class meeting the number required by the object. If not, an error is determined. When the jobs J10 and J20 are thrown in, the OS starts the execution of these jobs because the class having the number of 4 required by the jobs exists. In the case of the job J30, the number is not fixed and therefore, the OS matches the class of job J30 to one having the maximum number of processors of the presently existing classes when this job is started. Accordingly, in the case of FIG. 8, the execution of the job J30 is started with the parallel processor number being 7.

The parallel jobs J10 and J20 are invoked at time T1 on the serial processors 1003 and 1004, respectively. When the instructions P102 to P106 representing the parallel computing part of the first job J10 are started at time T2 earlier than the instructions P202 to P206 representing the parallel computing part of the second job J20, the serial processor 1004 which has executed the instruction P101 representing the serial computing part of the first job J10 acquires the parallel processors 1005 to 1008 at the time of invocation of the parallel computing part to proceed with the execution. Upon the invocation of the instructions of the parallel computing part, synchronization is made between the serial processor 1004 and each of the parallel processors 1005 to 1008. By permitting the synchronization to be made by only one serial processor during a predetermined interval of time, assignment of the parallel processors can be controlled. More particularly, once the serial processor 1004 starts the synchronization instruction at time T2, the serial processor 1003 is not allowed to execute synchronization instruction after the time T2. The serial processor 1003 is not allowed to effect synchronization before the parallel computing by the serial processor 1004 and the parallel processors 1005 to 1008 is terminated. Details of this processing will be described later with reference to FIG. 12.

Upon completion of the synchronization, the instructions P102 to P106 representing the parallel computing parts are executed in parallel by means of the serial processor 1004 and the parallel processors 1005 to 1008.

When the instructions P102 to P106 representing the parallel computing part are terminated, the parallel processors issue termination notices and by taking this opportunity, the execution is switched to the parallel computing part of the other parallel execution waiting job. At that time, since the execution of the previous parallel computing part has been terminated, save operation of registers of the parallel processors is reduced greatly and switching of less overhead can be realized. Generally, the parallel executing component realizes fast execution by using many registers. Therefore, the conventional switching method of parallel jobs executed in a time sharing manner requires save/restore of many registers when jobs are switched during the use of the parallel executing component. This register save/restore causes degradation of the performance, while the overhead can be reduced in the present embodiment.

After time T3, the execution of the parallel computing part of the job J10 by each of the parallel processors 1005 to 1008 is terminated and the termination is notified. Then, it is assumed that the termination of the execution of all the instructions in the parallel computing part of the job J10 is confirmed at time T4. It is further assumed that the execution of the instruction P201 in the serial computing part of the job J20 is terminated at time T4 and the execution of instructions P202 to P206 in the parallel computing part is waited for, the synchronization among the parallel processors 1004 to 1008 and the serial processor 1003 is made, and the instructions P202 to P206 in the parallel computing part are executed in parallel by the serial processor 1003 and the parallel processors 1005 to 1008. It is to be noted that when the execution of the parallel computing part of the job J10 is terminated, the serial processor 1004 executes the instruction P107 in the remaining serial computing part of the job J10.

When the instructions P202 to P206 in the parallel computing parts are terminated at time T5, each of the parallel processors 1005 to 1008 issues a termination notice and the serial processor 1003 executes the instruction P207 in the remaining serial computing part of the job J20. If there is another parallel execution waiting job at that time, the program is switched to the execution of a parallel computing part of this job.

As described above, in the present embodiment, a parallel computing part in a job and a serial computing part in another job can be executed in parallel and hence, the utilization of all the processors in the computer system can be increased. Particularly, in the example shown in FIG. 8, the two jobs J10 and J20 are executed in parallel.

In the conventional system, however, only the job J10 is allowed to be executed over, for example, time T1 to time T6. As a result, the time for the parallel processors 1005 to 1008 to be utilized is limited to an interval of from time T2 to time T3 and during the remaining time (T1 to T2 and T3 to T6), the parallel processors 1005 to 1008 cannot be utilized and are caused to be idle.

On the other hand, in the system of the present embodiment, the parallel processors 1005 to 1008 can be utilized during an interval of from time T2 to time T3 and during an interval of from T4 to T5, so that the time during which the parallel processors 1005 to 1008 are not utilized and are idle can be shortened, covering T1 to T2, T3 to T4 and T5 to T6 and the utilization of the parallel processors 1005 to 1008 can be improved.

Further, in the present embodiment, the parallel processors are processors equally functional to the serial processors and therefore, the ratio of the number of processors assigned for the serial processors to that of processors assigned for the parallel processors can be changed dynamically.

In FIG. 8, the OS has changed the ratio between the numbers of processors after time T6. More particularly, for example, the processor 1001 behaves as a serial processor and processors 1002 to 1008 behave as parallel processors after the time T6. Accordingly, when a new job J30 is invoked at time T7, the execution of an instruction P301 of a serial computing part is invoked on the serial processor 1001. When the instruction P301 in the serial computing part is terminated at time T8, synchronization is effected between the serial processor 1001 and each of the parallel processors 1002 to 1008 upon invocation of instructions of the subsequent parallel computing part. Upon completion of the synchronization, instructions P302 to P309 in the parallel computing part are executed in parallel by means of the serial processor 1001 and the parallel processors 1002 to 1008. Further, when the parallel computing part is terminated at time T9, the serial processor 1001 executes an instruction P310 in a serial computing part.

As described above, when the portion of parallel executing is large, one of all the processors is used as a serial processor and the remaining seven processors are used as parallel processors, thereby making it possible to carry out the execution by using all of the eight processors when the parallel computing part is processed. When a great number of parallel jobs are desired to be executed, for example, in the daytime, the processors 1001 to 1004 constitute serial processors and the processors 1005 to 1008 constitute parallel processors as shown at the left part in FIG. 8. On the other hand, when the number of jobs to be processed is small but the portion of parallel executing is large, for example, at night, one of all the processors can be used as the serial processor and the remaining seven processors can be used as the parallel processors.

Accordingly, in the example shown in FIG. 8, the form of system working in the daytime is shown before time T6 and the form of system working at night is shown after time T7. The ratio of the number of the serial processors to that of the parallel processors can be changed by means of a system operator.

In this manner, the number ratio of processors in the computer system can be changed in accordance with the ratio between the serial computing part and the parallel computing part of an job to be executed.

In the conventional computer system used for parallel job execution, serial processors for serial computing and parallel processors for parallel computing are fixed in number. In spite of the fact that the number ratio between serial computing part and parallel computing part differs for each parallel job, only computer systems in which the number ratio is fixed have long been presented. Besides, in the conventional computer system, a special parallel processor of an architecture differently constructed from the serial processor is employed for the purpose of improving the performance of parallel computation and therefore, the parallel processor is dedicated to the special computation and even if a plurality of parallel processors are provided, the whole of the parallel processors are handled integrally, thus preventing the parallel processors from being categorized to conform to the use. In other words, the ratio of the number of the serial processors to that of the parallel processors cannot be changed in accordance with the portion of serial computing and the portion of parallel computing.

Contrary to this, in the present embodiment, processors constituting the computer system are processors all having the equal function and according to the quality of executing parallel jobs, that is, the ratio of the number of serial computing parts to that of parallel computing parts, the ratio between the serial computing capability and the parallel computing capability is flexibly and dynamically changed to thereby increase the utilization of the computer system.

Next, the construction of the computer system for executing the parallel job as shown at (B) in FIG. 7 will be described with reference to FIG. 9.

Figure 9:
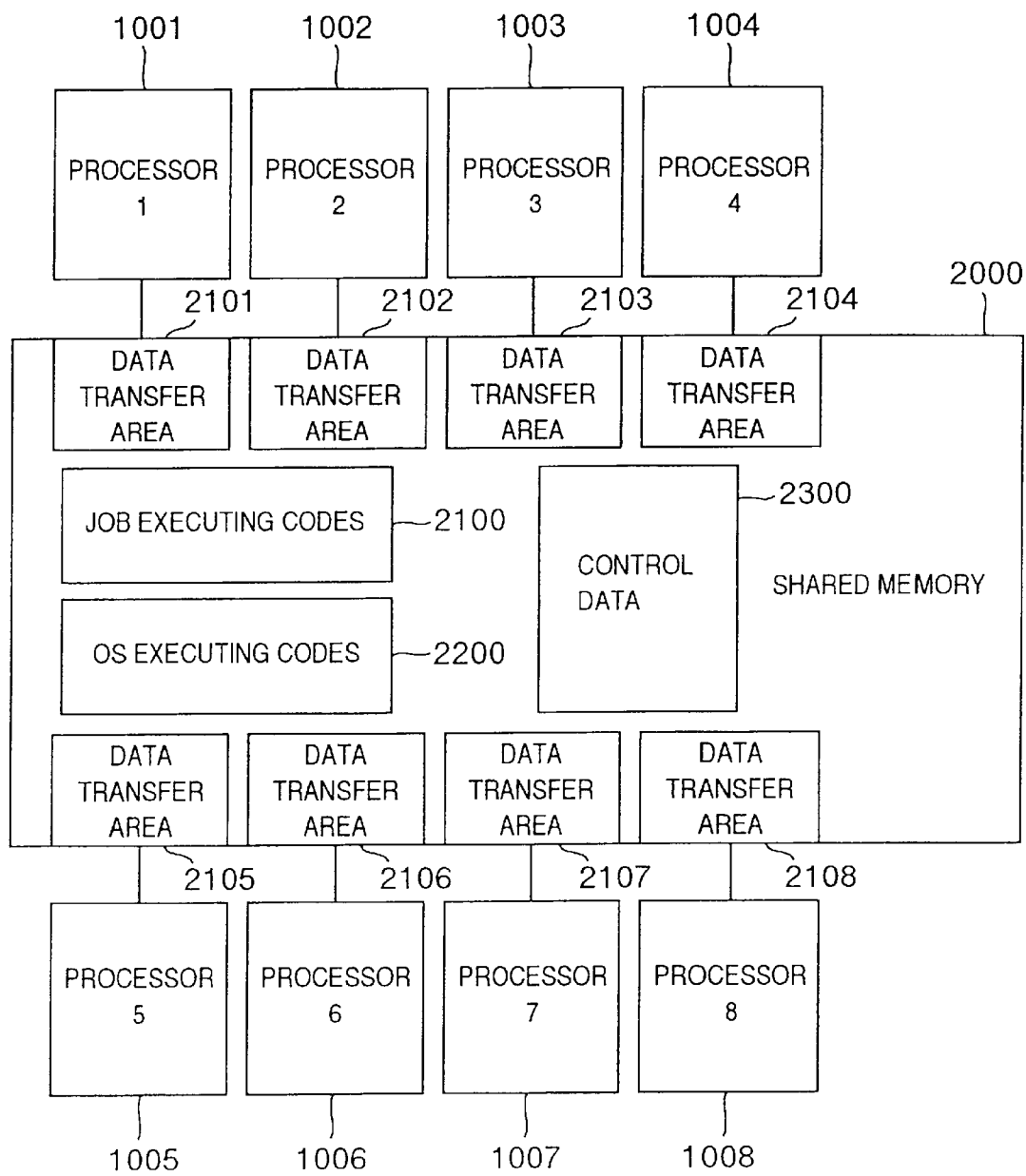
FIG. 9 is a diagram showing the system construction of a parallel-job multiple scheduling apparatus according to an embodiment of the present invention.

FIG. 9 shows an embodiment of the system construction of a system of the multiple parallel-job scheduling apparatus.

In the present embodiment, the computer system will be described as having eight processors. Processors 1001 to 1004 are used as serial processors and processors 1005 to 1008 are used as parallel processors.

One job is invoked on one serial processor. It is now assumed that a parallel job is invoked on the serial processor 1001. When the job is invoked, the execution of an instruction of a serial computing part (instruction P1 in FIG. 7) is initiated on the serial processor 1001. When instructions of a parallel computing part (instructions P2 to P6 in FIG. 7) are reached, these instructions of five blocks (instructions P2 to P6 in FIG. 7) are executed in parallel on the five processors 1001 and 1005 to 1008. The processors 1005 to 1008 constituting the parallel processor group are collectively assigned to the one parallel job.

Upon start and termination of the execution of the parallel computing part of one parallel job, synchronization to be described later is made between the one serial processor 1001 for execution of the serial computing part of the job and each of the processors 1005 to 1008 constituting the parallel processor group. The processors 1001 and 1005 to 1008 which participate in the synchronization are indicated by the synchronization range indicator 4100 (FIG. 1). By taking the opportunity of the synchronization made upon the initiation of the parallel computing part, the respective processors start to execute instructions assigned to them in the parallel computing part at a time, synchronization is also made when the parallel computing part is terminated, and after the termination of instructions by all of the processors is confirmed, the program proceeds to the next processing.

The respective processors 1001 to 1008 are in association with inter-processor data transfer areas 2101 to 2108 included in the shared memory 2000. Upon start of the parallel computing part, starting addresses assigned to instructions of the respective parallel processors are written into the inter-processor data transfer areas 2101 to 2108 in accordance with a program executed on the serial processor 1001, and the respective parallel processors 1005 to 1008 read the starting address data pieces to realize the assignment of the one parallel computing part to the multiple processors.

Job executing codes executed by the respective processors 1001 to 1008 are held in a job executing code 2100 which is a user code area. In the example shown in FIG. 7, the instructions P1, P2, P7, P8 and P13 are executed on the serial processor 1001. The instructions P3 and P9 are executed on the processor 1005, the instructions P4 and P10 are executed on the processor 1006, the instructions P5 and P11 are executed on the processor 1007 and the instructions P6 and P12 are executed on the processor 1008.

Figure 10:
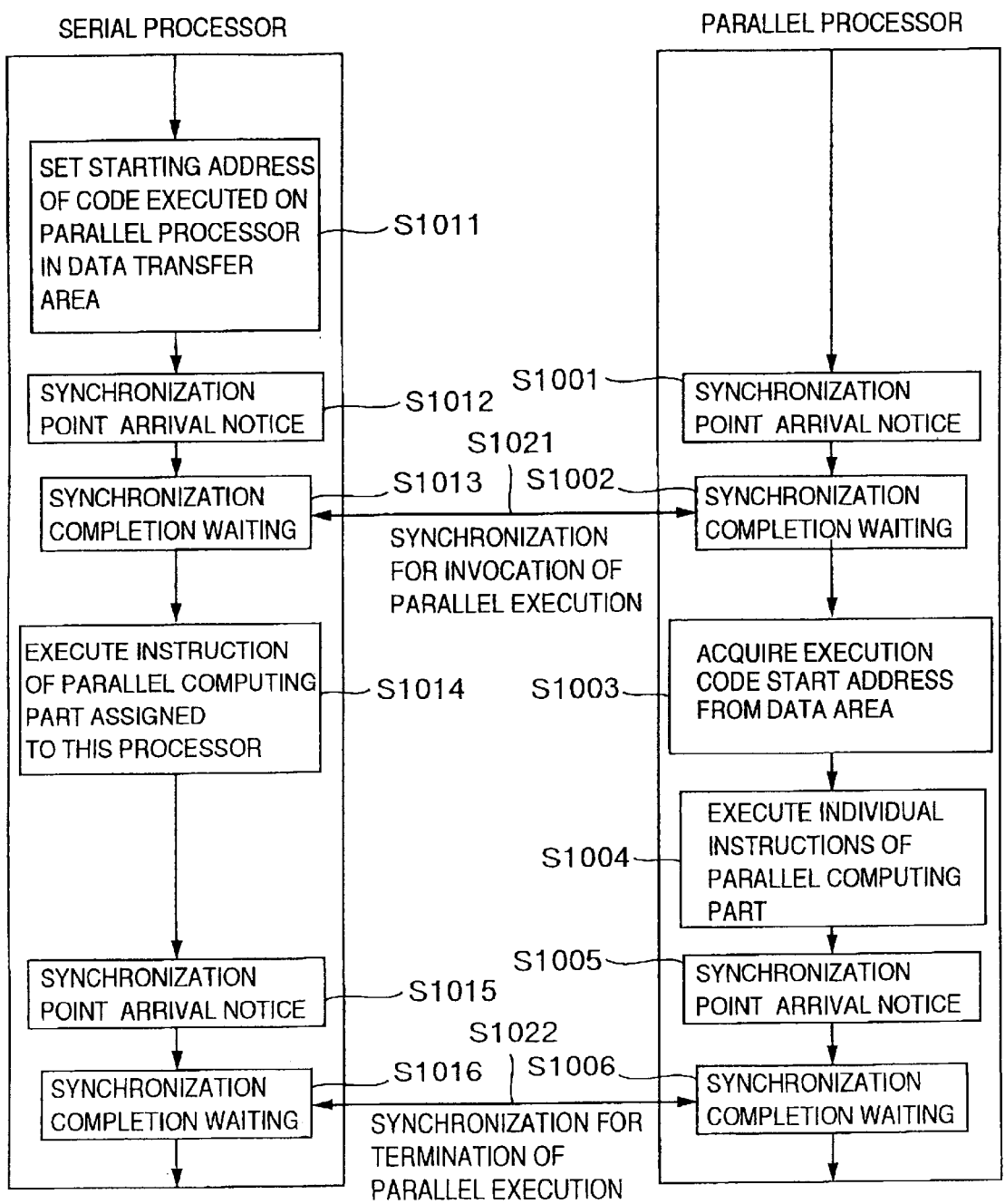
FIG. 10 is a flow chart for explaining the execution upon invocation/termination of a parallel computing part in a parallel-job multiple scheduling method according to an embodiment of the present invention.

Referring now to FIG. 10, details of the execution upon invocation and termination of one parallel computing part in the present embodiment will be described.

FIG. 10 is a flow chart for explaining the execution upon invocation and termination of the parallel computing part in the parallel-job multiple scheduling method according to an embodiment of the present invention.

Invocation and termination of the parallel computing part are carried out by using synchronization based on a barrier line provided between processors. As has been described in connection with FIG. 1, each of the processors in the processor group 1000 has a synchronization point arrival instruction transmitted through the synchronization point arrival signal line SRL for informing other processors that the processor of its own reaches synchronization and a synchronization completion waiting instruction for causing other processors to wait until the synchronization is reached. The synchronization among the processors is carried out by using these instructions.

Initial data necessary to start the execution of the parallel computing part on the parallel processors 1005 to 1008 can be realized by using the inter-processor data transfer areas 2105 to 2108, which can be consulted mutually by the serial computing component and the parallel computing component, as invocation data storing areas and transferring the necessary data.

FIG. 10 outlines invocation from a serial processor for one parallel computing part, processes on parallel processors and termination of the parallel computing part. The left side portion in FIG. 10 shows processes by the serial processor 1001 and the right side portion in FIG. 10 shows processes by each of the processors 1005 to 1008 constituting the parallel processor group.

In step S1001, each of the parallel processors 1005 to 1008 waiting for invocation of the parallel computing part executes the synchronization point arrival instruction and in step S1002, executes the synchronization completion waiting instruction so as to be brought into the waiting state. In this phase, from the viewpoint of synchronization, only the serial processor 1001 doses not reach the synchronization point.

On the other hand, in step S1011, in preparation for invoking instructions of the parallel computing part on the parallel processors 1005 to 1008, the serial processor 1001 sets, as invocation data, starting addresses of codes executed on the parallel processors to the inter-processor data transfer areas 2105 to 2108.

When the setting of the invocation data is completed, the serial processor 1001 executes the synchronization point arrival instruction in step S1012. Further, in step S1013, the serial processor 1001 informs the parallel processors that the serial processor 1001 of its own is ready for invocation of the parallel computing part, and executes the synchronization completion waiting instruction. Thereafter, the serial processor 1001 waits for the completion of the synchronization.

In the step S1012, as a result of the execution of the synchronization point arrival instruction, the synchronization between the serial processor 1001 and each of the parallel processors 1005 to 1008 is completed.

In step S1003, after the synchronization for invocation is terminated, the parallel processors 1005 to 1008 take out executing code starting addresses from the inter-processor data transfer areas 2105 to 2108, respectively, the starting addresses being data set by the serial processor 1001 in the step S1011 for invocation of the parallel computing part, and the execution of individual instructions of the parallel computing part is started in step S1004.

On the other hand, in step S1014, the serial processor 1001 also starts the execution of an instruction of the parallel computing part assigned to this processor.

When the serial processor 1001 terminates the execution of the instruction in the parallel computing part assigned to this processor in step S1015, it executes the synchronization point arrival instruction in order to wait for termination of the instructions in the parallel computing part which are in association with the parallel processors and then executes the synchronization completion waiting instruction in step S1016.

On the other hand, in step S1005, when each of the processors 1005 to 1008 constituting the parallel processors terminates the execution of the instruction in the parallel computing part which is assigned to the processor of its own, the processor executes the synchronization completion instruction in order to wait for completion of another instruction in the parallel computing part which is in association with another parallel processor and then executes the synchronization completion waiting instruction in step S1006.

In step S1022, at the time that the execution of the instructions by all the processors is completed and synchronization is reached, the serial processor 1001 terminates the processing of this parallel computing part. Upon the termination of the parallel computing part, data such as computation results is written to the inter-processor data transfer areas 2105 to 2108 used when the parallel computing part is invoked and the serial processor 1001 reads the data to permit the data to be transferred from the parallel processors 1005 to 1008 to the serial processor 1001.

Figure 11:
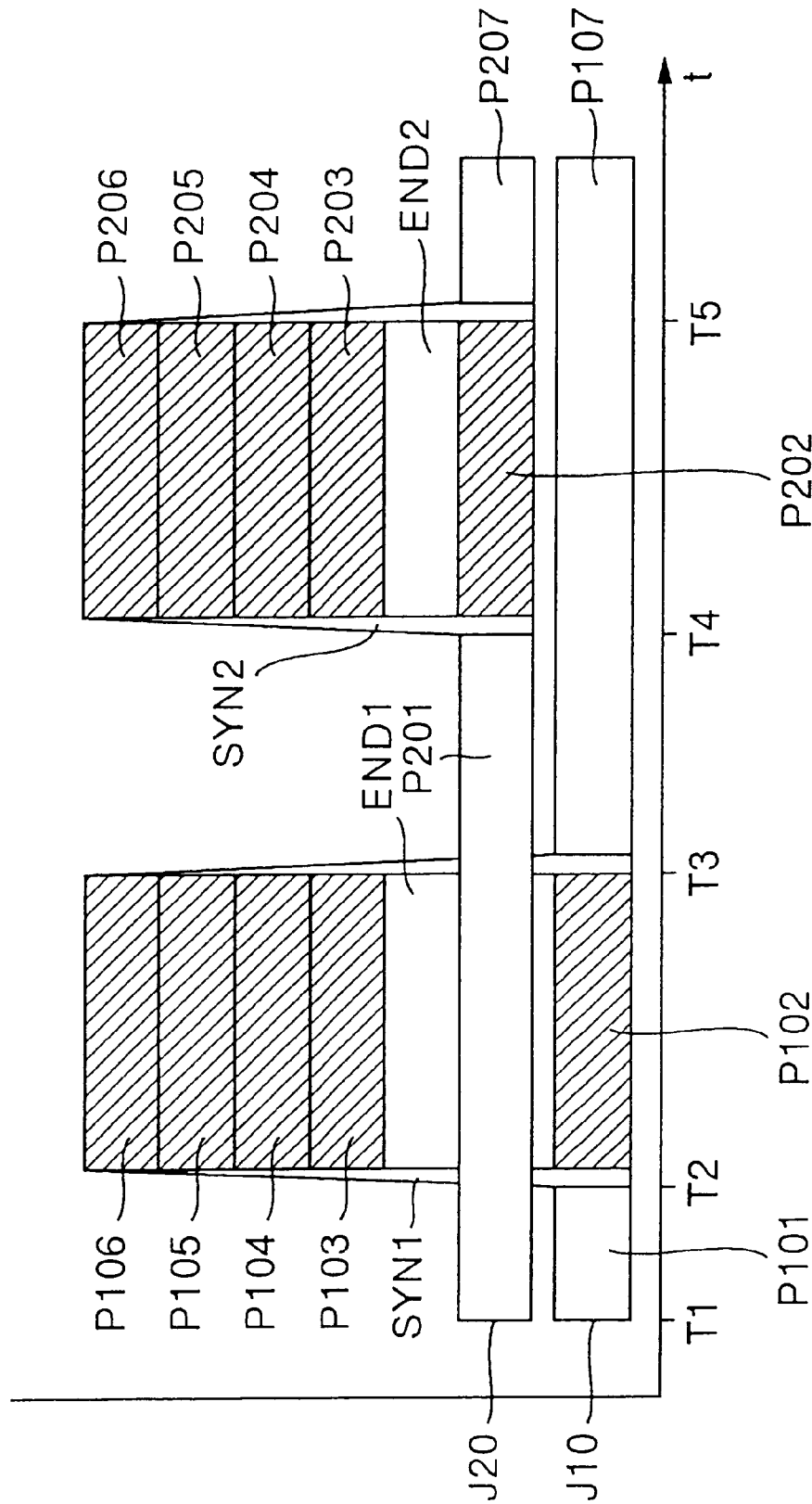
FIG. 11 is a diagram showing the outline of multiple execution of parallel jobs according to an embodiment of the present invention.

Referring now to FIG. 11, the multiple executing system of multiple parallel jobs, as show on the left side portion in FIG. 8, according to an embodiment of the present invention will be described.

FIG. 11 is useful to explain the outline of the multiple execution of the parallel jobs in this embodiment.

In particular, multiple processors are assigned to jobs as outlined in FIG. 11.

In the multiple executing system of the multiple parallel jobs according to the present embodiment, the multiple parallel jobs are invoked independently of each other on the multiple serial processors. When a parallel computing part is reached in each of the parallel jobs, the parallel computing part is executed by using parallel processors. Since in the present embodiment one serial processor is assigned to the serial computing part of one program as a dedicated processor, respective programs can be executed in parallel to each other without being stopped unless requests for use of the parallel processors collectively assigned to one program do not conflict with each other.

In the example shown in FIG. 11, an instance is illustrated where a plurality of information processing programs are executed in a multiple fashion on the computer system shown in FIG. 9. In the computer system shown in FIG. 9, the processors 1001 to 1004 are used as serial processors and the processors 1005 to 1008 are used as parallel processors.

The first and second jobs J10 and J20 are parallel jobs executed in parallel to each other. The first job J10 consists of an instruction P101 of a serial computing part, instructions P102 to P106 of a parallel computing part and an instruction P107 of a serial computing part. The second job J20, on the other hand, consists of an instruction P201 of a serial computing part, instructions P202 to P206 of a parallel computing part and an instruction P207 of a serial computing part.

The parallel jobs J10 and J20 are invoked on the serial processors 1004 and 1003, respectively, at time T1. In this manner, the serial computing parts of the two jobs are processed in parallel by means of the separate processors. In this example, the instructions P102 to P106 in the parallel computing part of the first job J10 invoked at time T2 earlier than the instructions P202 to P206 in the parallel computing part of the second job J20. Upon invocation of the instructions in the parallel computing part, the serial processor 1004 which has executed the instruction P101 in the serial computing part of the first job J10 acquires the parallel processors 1005 to 1008 to proceed with the execution and then, synchronization SYN1 is effected between the serial processor 1004 and each of the parallel processors 1005 to 1008.

When the synchronization is completed, the instructions P102 to P106 in the parallel computing part are executed in parallel by means of the serial processor 1004 and the parallel processors 1005 to 1008.

When the respective instructions P102 to P106 in the parallel computing part are terminated, the respective parallel processors 1005 to 1008 issue termination notices END1 and by taking this opportunity, the procedure is switched to the execution of the parallel computing part of the other parallel execution waiting job. In this phase, since the execution of the previous parallel computing part is terminated, save operation to registers in the parallel processors can be reduced greatly, thus ensuring that switching at less overhead can be realized.

After time T3, the execution of the parallel computing part of the job J10 by the respective parallel processors 1005 to 1008 is terminated and the termination notice END1 is issued.

On the other hand, the parallel processors 1005 to 1008 are not used for execution of the instruction P201 of the job J20 and the instruction P201 can be executed in parallel with the processing of the job J10 during an interval of from time T1 to time T4.

At time T4, the execution of the instruction P201 in the serial computing part of the job J20 is terminated to wait for the execution of the instructions P202 to P206 in the parallel computing part. Then, the serial processor 1001 applies synchronization SYN2 to the parallel processors 1005 to 1008 and thereafter the instructions P202 to P206 in the parallel computing part are executed in parallel by means of the serial processor 1001 and the parallel processors 1005 to 1008. It is to be noted that when the execution of the parallel computing part of the job J10 is terminated, the serial processor 1004 executes the instruction P107 in the remaining serial computing part of the job J10.

When the instructions P202 to P206 in the parallel computing part are terminated at time T5, each of the parallel processors 1005 to 1008 issues a termination notice END2 and the serial processor 1003 executes the instruction P207 in the remaining serial computing part of the job J20.

As will be seen from the above, unless the parallel computing parts in the multiple jobs are executed at a time, the parallel processors which are idle during the execution of the serial computing part of one job can be assigned to the execution of the parallel computing part of the other job and the utilization of the whole of the system can be increased.

As well known in the art, excepting the case where a special job for performing benchmarking is carried out, the frequency of parallel computation of parallel jobs is not always high and during the processing of one parallel job, many idle time zones for the parallel computing component take place. Accordingly, by the method of the present invention which takes advantage of the idle time zones, the throughput of the computer system can be improved.

Figure 12:
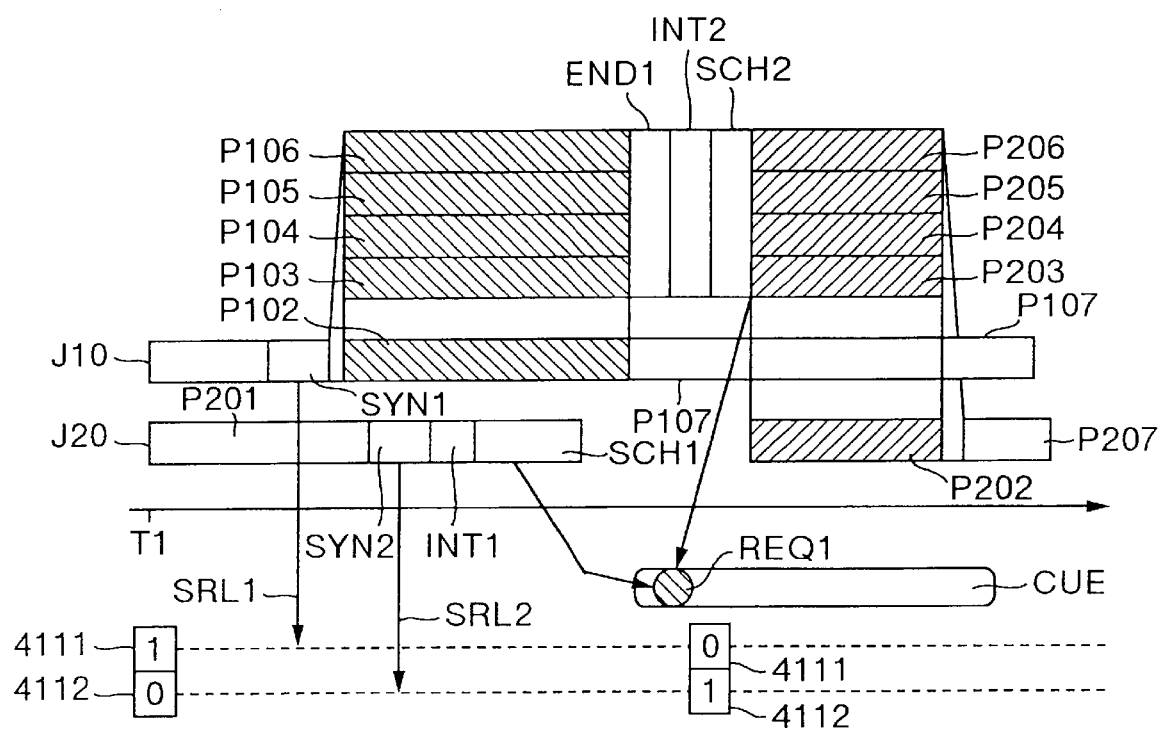
FIG. 12 is a diagram for explaining a system of controlling the assignment of parallel processors to programs in the parallel-job multiple scheduling according to an embodiment of the present invention.

Referring now to FIG. 12, an embodiment of a method of controlling the assignment of parallel processors to a plurality of programs when the plurality of programs process parallel execution parts concurrently as shown in FIG. 11 will be described.

FIG. 12 is useful to explain the method of controlling the assignment of parallel processors to programs in the parallel-job multiple scheduling method.

Firstly, the procedure for invocation of the parallel computing part will be described.

The procedure to be explained hereunder, the computer system will be described as having eight processors, as shown in FIG. 9.

As has been described in connection with FIG. 11, first and second jobs J10 and J20 are parallel jobs executed in parallel. The parallel jobs J10 and J20 are invoked at time T1 on the serial processors 1001 and 1002, respectively.

In the figure, reference numerals 4111 and 4112 designate the states of the first and second bits of the synchronization range indicating register 4110 of eight bits shown in FIG. 2, respectively. Bits of the synchronization range indicating register 4110 correspond to the processors 1001 and 1002, respectively. In the illustrated example, the bit corresponding to the serial processor 1001 has a value which is assumed to be set to "1" in the beginning of the start of the execution. The bit corresponding to the serial processor 1002 has a value which is set to "0".

For invocation of the parallel computing part, the serial processors 1001 to 1004 and the parallel processors 1005 to 1008 carry out the synchronization by using the synchronization point arrival instructions. The synchronization point arrival instruction sorts the modes of the processing in accordance with the contents of the register 4110 in the synchronization range indicator 4100. If "1" is set to the bit corresponding to the processor which has executed the synchronization point arrival instruction, the synchronization proceeds without alteration. On the other hand, if "0" is set to the bit, the serial processor is so determined as not to be allowed to use the parallel processors and an interrupt to this effect is generated.

It is now assumed that the two jobs J10 and J20 are started for execution from the initial state shown in FIG. 12 and the job J10 reaches instructions P102 to P106 in a parallel computing part earlier than the job J20. In this example, when the first bit of the register 4110 of the synchronization range indicator 4100 is consulted, it is indicated that the bit is set with "1" and the job J10 is allowed for the parallel computation, so that a synchronization point arrival instruction SRL1 for invocation SYN1 is executed without alteration and the instructions P102 to P106 in the parallel computing part are started.

On the other hand, if the job J20 executes a synchronization point arrival instruction SRL2 during the execution of the instructions P102 to P106 in the parallel computing part by the job J10 to meet an invocation SYN2 of the parallel computing part, an interrupt INT1 is generated on the processor because "0" is set to the second bit of the register 4110 of the synchronization range indicator 4100. In response to this interrupt INT1, a scheduler SCH1 is invoked, with the result that a parallel computing request REQ1 is put in a parallel execution waiting queue CUE and the assignment of parallel processors is waited for.

As has been described in connection with FIG. 6, the parallel execution waiting queue CUE is put in the queue starting address field 2502 in the class control data 2500 held on the shared memory 2000 in the order of generation of the parallel computing request REQ.

Thus, by setting "1" to the bit corresponding to one serial processor and causing a synchronization point arrival instruction executed upon invocation of a parallel computing part to examine the bit of the register 4110 in the synchronization point arrival indicator 4100 corresponding to the processor which has executed the synchronization point arrival instruction and to proceed with the processing in accordance with the modes of for sorting whether parallel processors are available or not, the parallel processors can be assigned exclusively.

During an interval of time, in the register 4110 of the synchronization range indicator 4100, "1" is set to bits corresponding to parallel processors and a bit corresponding to a serial processor assigned with the parallel processors. For example, in the example shown in FIG. 2, "1" is set to the fifth to eighth bits corresponding to the parallel processors 1005 to 1008 and the first bit corresponding to the serial processor 1001 assigned with the parallel processors.

Accordingly, for a parallel computation request using a synchronization point arrival instruction of a serial processor assigned with parallel processors, start of the parallel computation is allowed without alteration but for a parallel computation request by a serial processor not assigned with parallel processors, an interrupt is generated to invoke the scheduler so as to establish a waiting state, permitting an invocation request to be put in the parallel execution waiting queue.

In order to switch the job on the parallel processors, "0" is set to a bit corresponding to a serial processor assigned to the old job to inhibit the processor from invoking the parallel computation but "1" is set to a bit corresponding to a serial processor assigned to a new job to allow the processor to invoke the parallel computation.

As will be seen from the above, the method of the present embodiment advantageously features that the synchronization range indicator 4100 is used as a parallel processor affinity indicator which indicates the affinity between serial processors and parallel processors.

Returning to FIG. 12, the operation of the computer system when the execution of the parallel computing part is completed will be described. The right side portion in FIG. 12 shows the outline of changing the execution program on the parallel processors.

In the present embodiment, processors constituting the parallel processor group are collectively assigned to a parallel computing part in one program and upon invocation and termination of one parallel computing part, synchronization is carried out between each of the parallel processors and a serial processor.

As described previously, it is assumed that while the instructions P102 to P106 in a parallel computing part are processed on the parallel processors 1005 to 1008 in the job J10, invocation of parallel computation is failed in the job J20 and a parallel execution request is put in the parallel execution waiting queue.

When, after the completion of the synchronization for terminating the parallel computing part, (1) the compiler determines that the executing time for the succeeding serial computing part is longer than a constant time or (2) the user gives an indication in the program at the final portion of the parallel computing part, a termination notice (parallel computing part termination notice) for immediately switching the assignment of the parallel processors to the execution of a parallel computing part of another job is issued. With the parallel computing part termination notice issued, an interrupt is invoked on processors constituting parallel processors.

More particularly, upon the termination of the instructions P102 to P106 in the parallel computing part of the job J10, each of the parallel processors 1005 to 1008 issues a parallel computing part termination notice END1 for indicating that the parallel processors are to be transferred to the job put in the parallel execution waiting queue. In response to this termination notice END1, an interrupt INT2 is invoked on the parallel processors 1005 to 1008. By taking the opportunity of this interrupt INT2, a scheduler SCH2 in the shared memory 2000 is invoked, thereby making it possible to save a smaller number of registers under the terminated state of the previous information processing program than made in time sharing scheme.

In this phase, since the procedure for the job J10 on the parallel processors 1005 to 1008 is completed, it is not necessary to save all states of the processors but only the contents of a prescribed minimal number of registers is saved. More specifically, upon the termination of the procedure for the parallel computing part, only a very small amount of data on the processors 1005 to 1008 constituting the parallel processor group is required to be saved and consequently, the job assigned with the parallel processors can be changed at a high speed.

Here, the fact that only as small a number of registers as necessary are saved is recorded by setting a register save range flag 2408 (FIG. 5) and the procedure for another job in parallel execution waiting condition is started.

If the termination notice is not issued, the switching will not be done. It is important herein that the termination notice is issued only when the executing time for the succeeding serial computing part is longer than the constant time. Through this, only when the serial computing time of one parallel job is long enough to execute a parallel computing part of another parallel job, the switching of the parallel processors is effected and during the idle time for the parallel processors, the parallel computing part of the other parallel job can be assigned. Even if the termination notice is issued when the executing time of the succeeding serial computing part is short and the destination of the assignment of the parallel processors is changed, this does not have any influence on the calculation results.

But, if the destination of the assignment of the parallel processors is changed by issuing the termination notice each time that the parallel computing part is terminated when, for example, one parallel job frequently repeats a parallel computing part of a short executing time and a serial computing part of a short executing time, then the overhead of scheduling will be increased as compared to the calculation time consumed in substantial calculation and the utilization of the whole of the computer system will be reduced.

As described above, the present embodiment have the function of not simply switching the destination of the assignment of the parallel processors in response to the termination of the parallel computing part but analyzing the lengths of the executing times of the serial and parallel computing parts of an executed job and the distribution of the lengths and performing the switching on the basis of the results of analysis, parallel processors being idle during the processing of one job can be assigned to another job at low overhead.

After the generation of the interrupt INT2, the scheduler SCH2 reads the starting parallel computing request REQ1 held in the parallel execution waiting queue CUE to assign the parallel processors 1005 to 1008 to the job J20 which has been in parallel execution waiting condition and the execution of the instructions P202 to P206 in the parallel computing part of the job J20 is started.

When the job is switched on the parallel processors, the scheduler SCH2 changes the setting of the register 4110 in the synchronization range indicator 4100 to set "0" to the bit 4111 corresponding to the serial processor 1001 assigned to the job J10 representing the old job in order to inhibit the invocation of the parallel computation by that processor, and sets "1" to the bit 4112 corresponding to the serial processor 1002 assigned to the job J20 representing a new job so as to permit the invocation. Details of the operation of the scheduler SCH2 will be described later with reference to FIGS. 14 to 21.

Here, it is important that the scheduler is invoked on the parallel processors. As soon as the instructions P102 to P106 in the parallel computing part of the job J10 are terminated, the processor 1001 starts the execution of the instruction P107 in the succeeding serial computing part of the job J10.

In parallel therewith, on the parallel processors 1005 to 1008, on the other hand, the procedure for switching the job is carried out but this processing can be effected without affecting the instruction P107 in the serial computing part of the job J10 and therefore, during an interval of overhead of job switching, the computation by the serial processor can be executed.

As described above, according to the parallel-job multiple scheduling method of the present embodiment, the parallel computing part is executed by the parallel processors and the serial processor in combination to prevent the serial processor from being idle. This can be accomplished by only the method of the present embodiment in which the parallel processors are constituted by processors being equally functional to the serial processor and the parallel processors are used commonly by a plurality of serial processors.

In the conventional method, on the other hand, the timing of switching is determined by a timer interrupt, so that in general the contents of many registers must be saved and recovered. In the method of the present embodiment, however, by using the termination of the parallel computing part as the timing for switching the assignment of the parallel processors, the job can be switched at good timing and the number of registers to be saved and recovered can be reduced greatly to mitigate the overhead of the job switching.

A method of detecting a failure to effect the synchronization in the present embodiment will be described.

In the event that among the multiple parallel processors participating in one synchronization, a parallel processor exists which cannot reach the synchronization point within a default time value in the OS or within a time which the program has indicated to the OS in advance (predetermined time), the synchronization is defined to be failed. A synchronization timeout register to which a time preceding the determination of a failure of the synchronization is set by the OS is provided so that an interrupt may be generated to the OS after time is up.

When the synchronization is started but any of the processors does not reach the synchronization point before the indicated time has elapsed, an interrupt for notifying a synchronization failure is generated on the processor and by taking this opportunity, the scheduler is invoked to perform the error processing. Setting of the synchronization timeout register is carried out by the synchronization timeout register setting field 2306 (FIG. 4) provided on the shared memory 2000.

Figure 13:
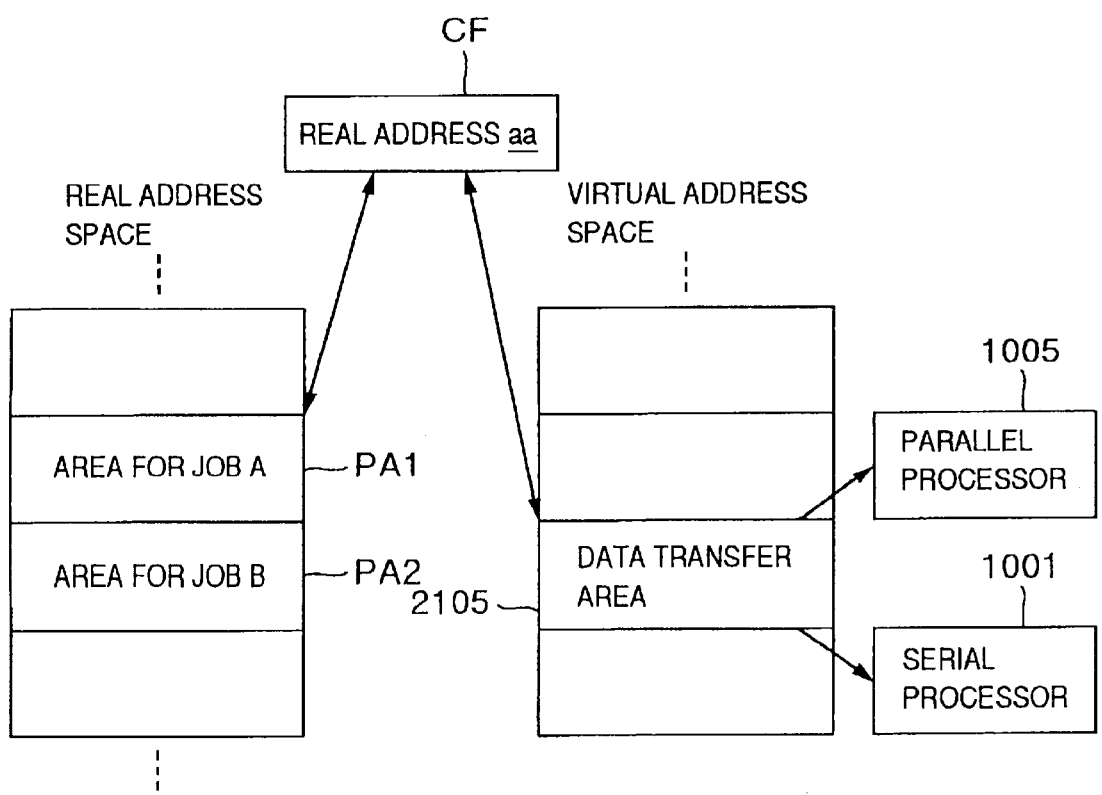
FIG. 13 is a diagram for explaining a method of controlling data transfer areas in the parallel-job multiple scheduling method according to an embodiment of the present invention.

Referring now to FIG. 13, a method of controlling the data transfer areas upon the job switching in the present embodiment will be described.

FIG. 13 is a diagram for explaining an embodiment of the data transfer controlling method in the parallel-job multiple scheduling method.

The method for data transfer between the serial processors and the parallel processors has already been described. In the present embodiment, in order to operate a plurality of jobs in parallel, the contents of the inter-processor data transfer areas 2101 to 2108 used for data transfer between the serial processor and the parallel processors must be saved and recovered each time that the job is switched. To cope with this inconvenience, the inter-processor data transfer areas are prepared in a real address space by the number identical to that of jobs to be executed in parallel and they are made to correspond to the same number of addresses in a virtual address space. The inter-processor data transfer areas are set in the inter-serial/parallel processor data transfer area assignment field 2303 (FIG. 4). By changing the assignment between the serial and parallel processors, the states of the inter-processor data transfer areas need not be saved and recovered and the assignment of the parallel computation component can be changed at a high speed.

Here, an instance where, for example, two jobs A and B are executed in parallel will be described with reference to FIG. 13. For example, the job A is the job J10 shown in FIG. 11 and the job B is the job J20 shown in FIG. 11. The following description will be given by way of example of the inter-processor data transfer area 2105 corresponding to the processor 1005.

Two inter-processor data transfer areas dedicated to the two jobs A and B, respectively, are prepared on different memory pages PA1 and PA2 in the real address space in correspondence to the two jobs A and B. Starting addresses of the memory pages PA1 and PA2 are real addresses aa and bb, respectively.

In the virtual address space, on the other hand, the inter-processor data transfer area 2105 is prepared at a virtual address x. The serial processor 1001 and the parallel processor 1005 in the parallel processor group apparently exchange data through the area 2105 in the virtual address space. On the other hand, an address of an area dedicated to a job being executed at present is made to correspond to the virtual address x. The assignment is indicated by the inter-serial/parallel data transfer area assignment field CF.

In the illustrated example, it is demonstrated that the starting address aa of the area dedicated to the job A is made to correspond to the virtual address x. Through this, during the execution of the job A, read/write of data between the serial processor and the parallel processors can be realized by causing the serial processor 1001 to write data into this area and causing the parallel processor 1005 to read the data from this area.

When the executed job is switched, for example, when the executed job is switched from job A to job B, write/read to/from the area dedicated to the job B can be ensured by changing the real address corresponding to the virtual address x from "aa" to "bb".

Next, the processing procedure of the scheduler a for switching the assignment of parallel processors in the present embodiment will be described with reference to FIGS. 14 to 21.

Figure 14:
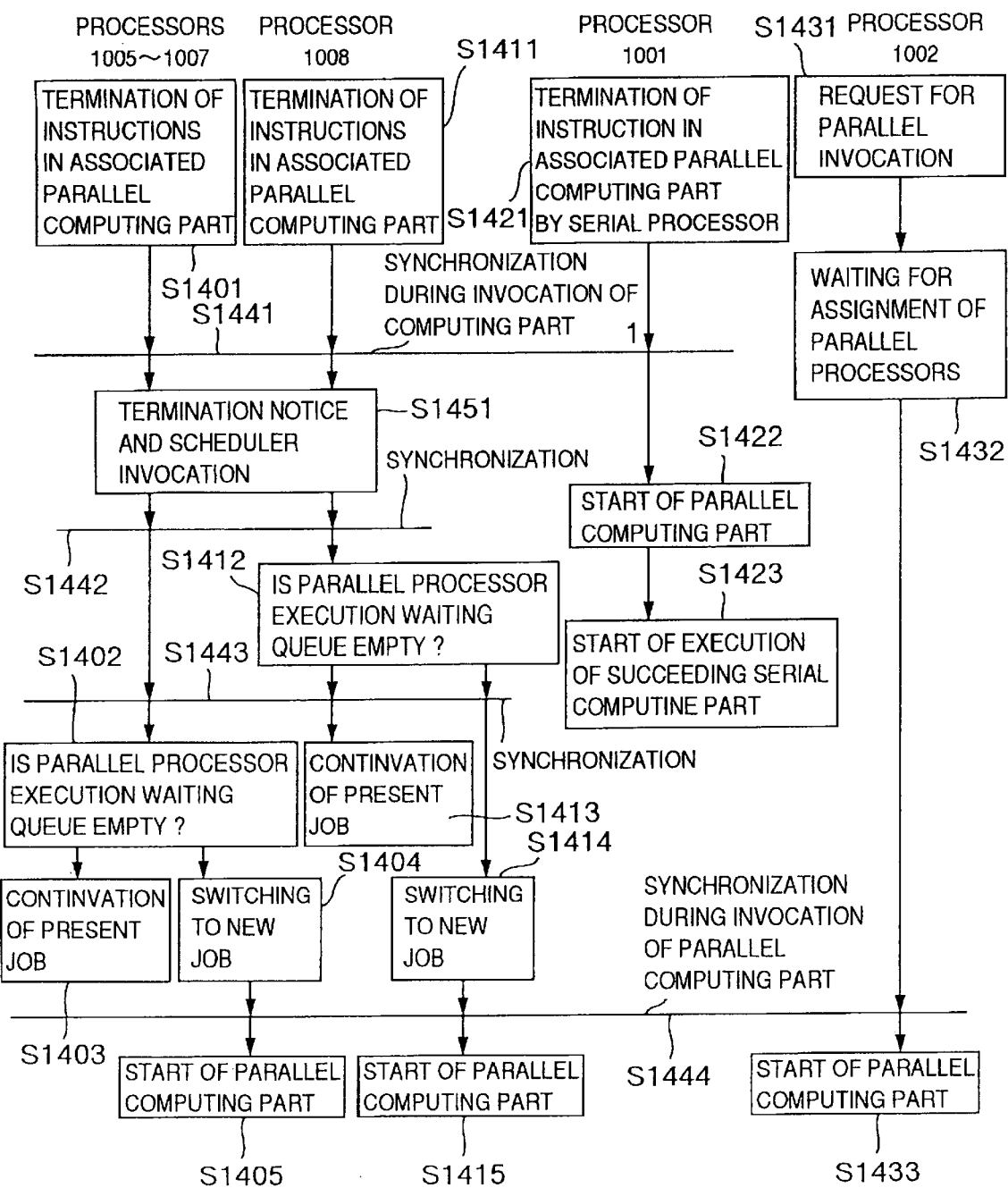
FIG. 14 is a flow chart showing the outline of the overall operation of a scheduler SCH2 (FIG. 12) invoked on the parallel processors shown in FIG. 9 according to an embodiment of the present invention.

FIG. 14 is a flow chart showing the outline of the overall operation of the scheduler SCH2 (FIG. 12) invoked on the parallel processors shown in FIG. 9 according to an embodiment of the present invention, and FIGS. 15 to 21 are flow charts for explaining details of the processing shown in FIG. 14.

Figure 15:
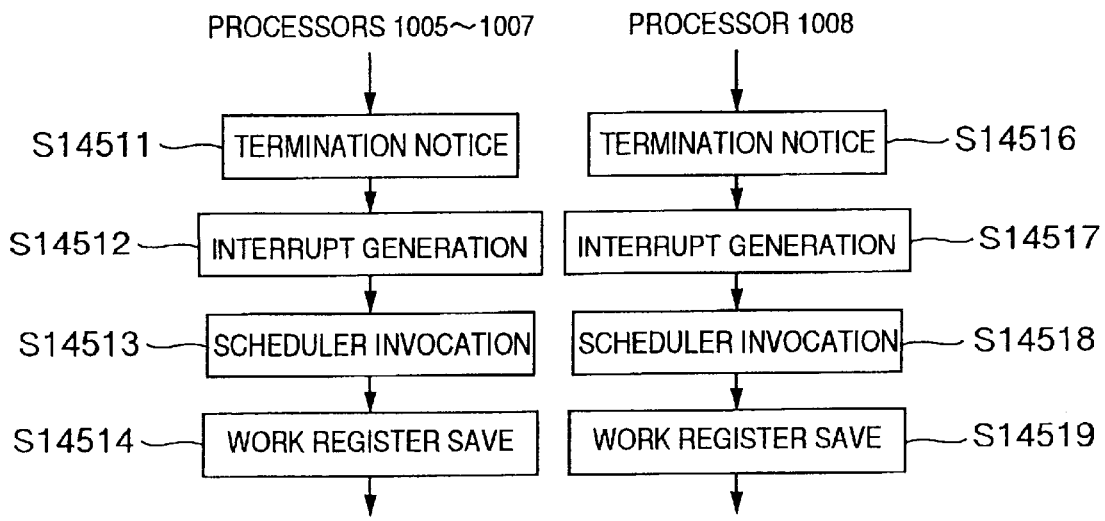
FIG. 15 is a flow chart for explaining details of the processing shown in FIG. 14.
Figure 16:
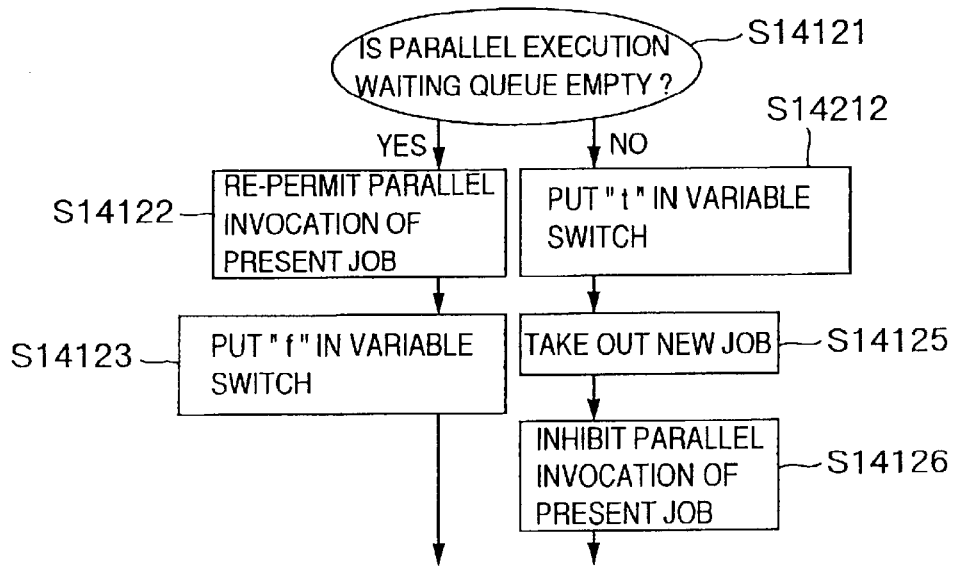
FIG. 16 is a flow chart for explaining details of the processing shown in FIG. 14.
Figure 17:
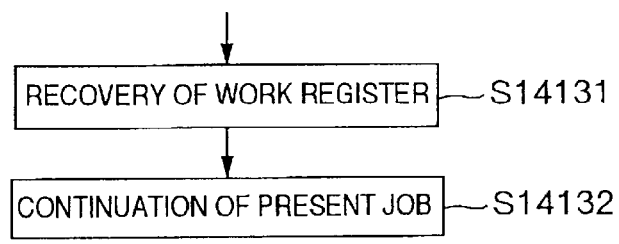
FIG. 17 is a flow chart for explaining details of the processing shown in FIG. 14.
Figure 18:
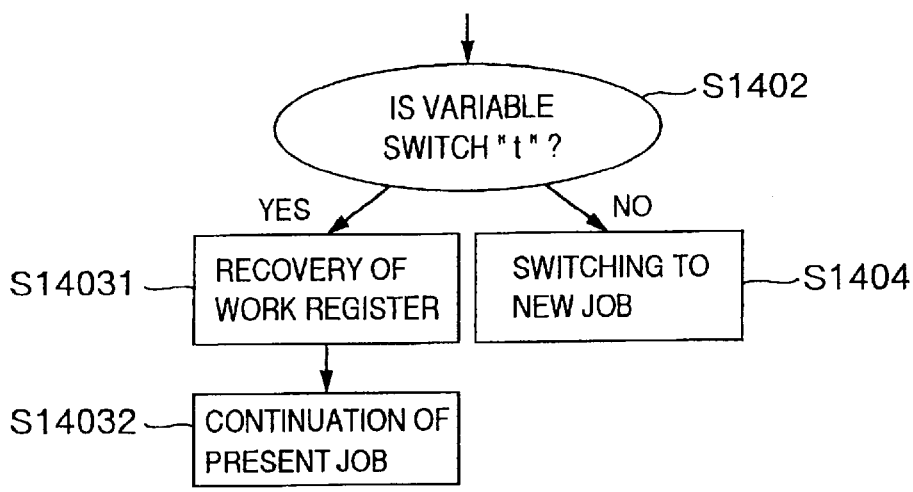
FIG. 18 is a flow chart for explaining details of the processing shown in FIG. 14.
Figure 19:
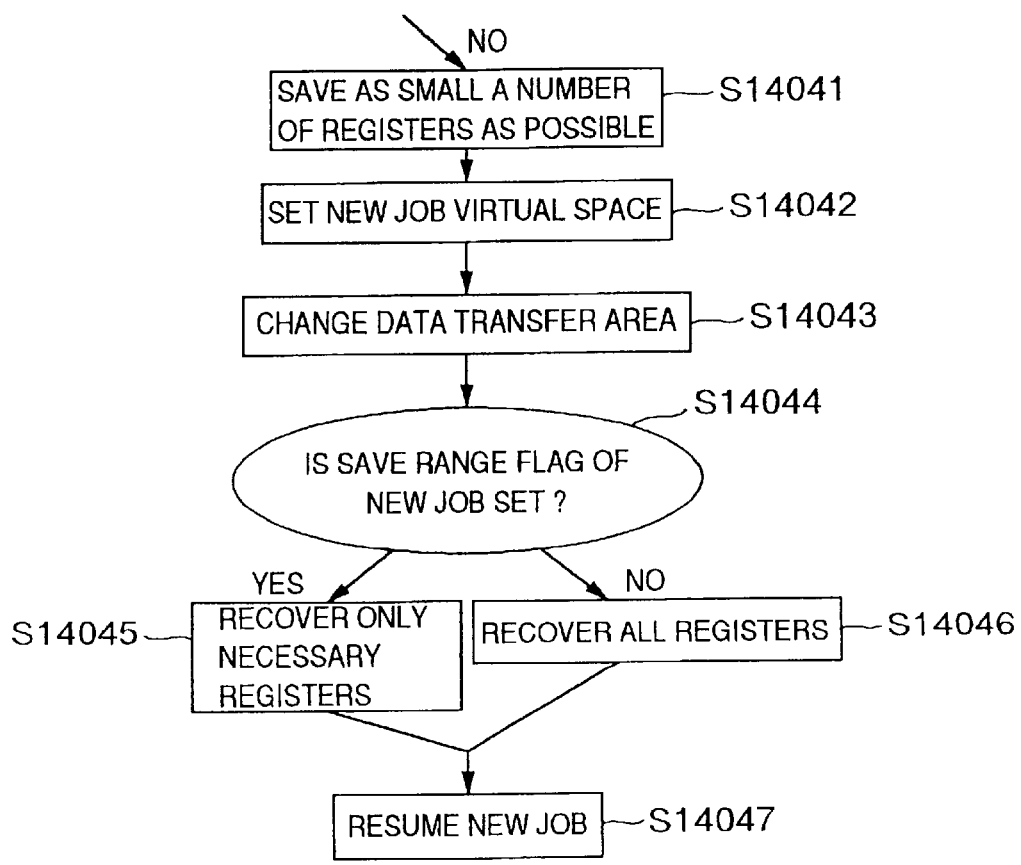
FIG. 19 is a flow chart for explaining details of the processing shown in FIG. 14.
Figure 20:
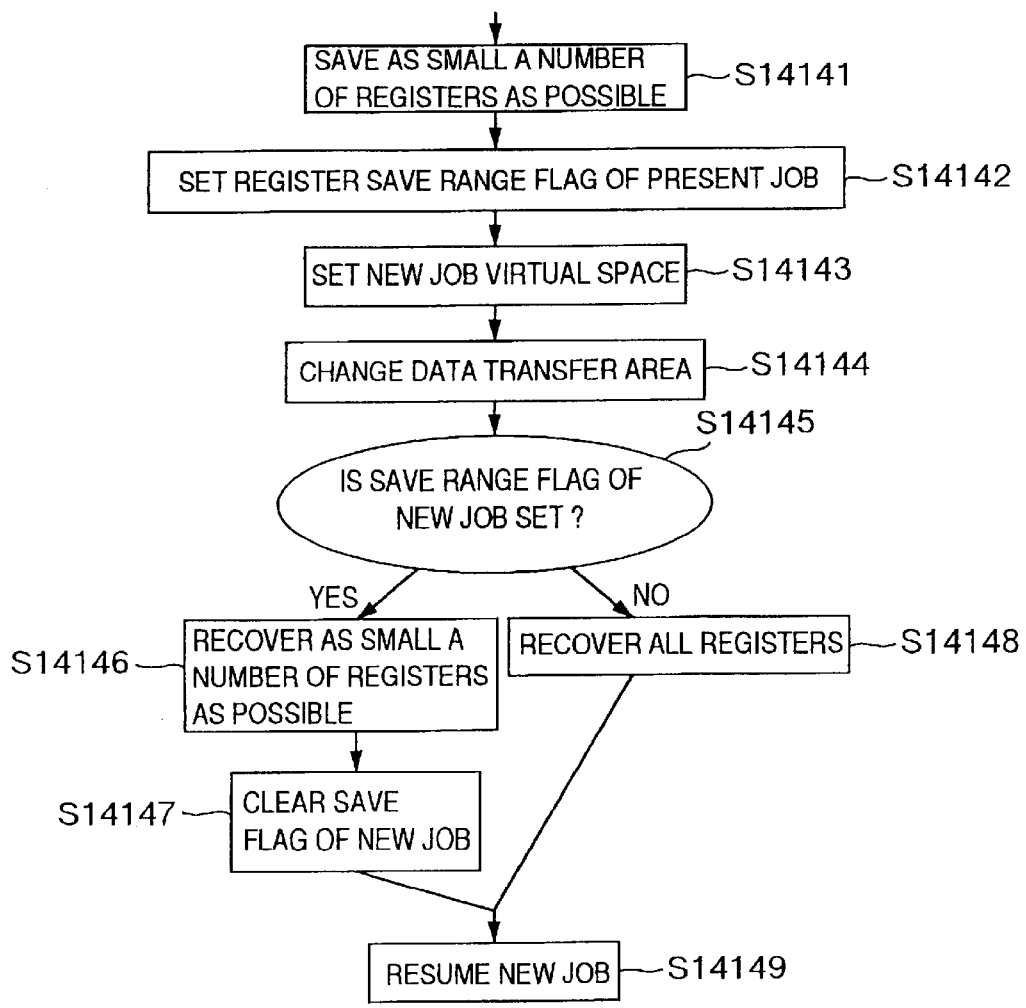
FIG. 20 is a flow chart for explaining details of the processing shown in FIG. 14.
Figure 21:
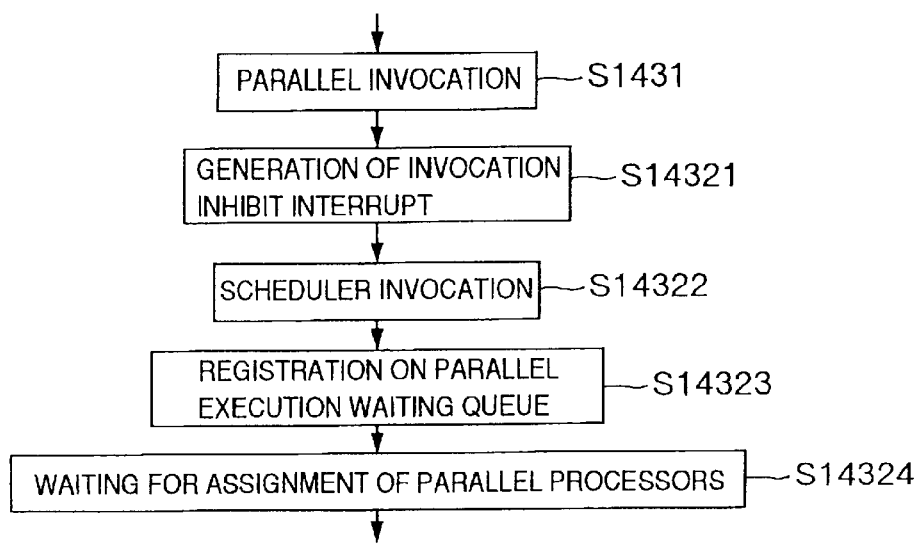
FIG. 21 is a flow chart for explaining details of the processing shown in FIG. 14.

In particular, FIG. 15 is for explaining details of the processing of step S1451 in FIG. 14. FIG. 16 is for explaining details of the processing of step S1412 in FIG. 14. FIG. 17 is for explaining details of the processing of step S1413 in FIG. 14. FIG. 18 is for explaining details of the processing of steps S1402 and S1403 in FIG. 14. FIG. 19 is for explaining details of step S1404 in FIG. 14. FIG. 20 is for explaining details of the processing of step S1414 in FIG. 14. FIG. 21 is for explaining details of the processing of steps S1431 and S1432 in FIG. 14.

In FIG. 14, when instructions in a parallel computing part which are associated with the parallel processors 1005 to 1007 is terminated in step S1401, an instruction in the parallel computing part which is associated with the parallel processor 1008 is terminated in step S1411 and an instruction in the parallel computing part which is associated with the serial processor 1001 is terminated in step S1421, synchronization upon the parallel computation termination is carried out in step S1441.

Subsequent to the synchronization upon the parallel computation termination, a termination notice and invocation of the scheduler are executed in the step S1451. More particularly, as detailed in FIG. 15, each of the parallel processors 1005 to 1007 issues a termination notice indicative of yield of the parallel processor group in step S14511 and the parallel processor 1008 issues a termination notice indicative of yield of the parallel processor group in step S14516.

Subsequently, in step S14512, each of the parallel processors 1005 to 1007 issues an interrupt and in step S14517, the parallel processor 1008 issues an interrupt. Responsive to these interrupts, the parallel processors 1005 to 1007 invoke a scheduler in step S14513 and the parallel processor 1008 invokes a scheduler in step S14518.

With the schedulers invoked, the parallel processors 1005 to 1007 save work registers required to be used subsequently in step S14514 and the parallel processor 1008 saves work registers required to be used subsequently in step S14519.

Returning to FIG. 14, in step S1442, the processors 1001 and 1005 to 1008 effect synchronization to warrant that all the processors are placed in condition allowed for scheduling.

Next, the processor 1008 behaves as a master processor in the schedulers. In the step S1412, the processor 1008 examines whether or not the parallel execution waiting queue CUE (FIG. 12) is empty by consulting the queue starting address field 2502. In other words, as detailed in FIG. 16, the parallel processor 1008 examines in step S14121 whether or not the parallel execution waiting queue is empty.

As a result, when the queue is empty, the processor 1008 again permits the parallel invocation of the present job in step S14122 and thereafter, writes "f" (false) into a variable SWITCH in step S14123.

When the queue is not empty, the processor 1008 writes "t" (true) into the variable SWITCH in step S14124. The fact that the variable SWITCH is written with "t" or "f" is noticed to each processor.

Further, in step S14125, the processor 1008 takes out a parallel invocation request REQ1 (FIG. 12) of a switching destined new job from the queue and stores the request at a position which the processors 1005 to 1007 can refer to. Further, in step S14126, "1" is set to a bit of the synchronization range indicating register corresponding to a serial processor for the new job to permit the use of parallel processors. For example, as shown in FIG. 12, "1" is set to the bit 4112 of the synchronization range indicating register corresponding to the serial processor 1002 of the job J20.

Returning to FIG. 14, when the processing in the step S1412 ends, a synchronization instruction is executed in the step S1443. The synchronization is effected with the aim of warranting the termination of the change of the variable SWITCH and parallel invocation re-permission for the present job when the queue is empty and with the aim of warranting the completion of the change of the variable SWITCH, setting of the new job and setting of permitting the serial processor for the new job to use parallel processors when the queue is not empty.

To continue describing the processing by the processor 1008, when the parallel waiting queue is determined to be empty in the step S1412, the processor 1008 continues the present job in step S1413. More particularly, as detailed in FIG. 17, the processor 1008 recovers the work register in step S14131 and then continues the present job in step S14132. Since the parallel computing part is terminated for the previous job, the waiting state is established on the parallel processor 1008 until the next parallel computing execution request arrives.

Following the completion of the synchronization in the step S1443, each of the processors 1005 to 1007, on the other hand, decides in the step S1402 whether the parallel waiting queue is empty and then executes continuation of the present job in the step S1403 or the switching to the new job in the step S1404. The decision in the step S1402 proceeds by causing, as shown at step S1402 in FIG. 18, the processor 1008 to sort the modes in accordance with the value of variable SWITCH set in the steps S14123 and 14124 (FIG. 16).

In FIG. 18, when the variable SWITCH is "f", the processors 1005 to 1007 do not change the execution job in step S14031 but recover the work register which has previously been saved and resume the execution of the original job in step S14032. Since the parallel computing part is terminated in the original job, the waiting state is established on the parallel processors 1005 to 1007 until the next parallel computation executing request arrives.

On the other hand, when the processor 1008 sets "t" to the variable SWITCH, switching to a new job is executed in step S1404. More particularly, as detailed in FIG. 19, each of the processors 1005 to 1007 saves in step S14041 as small a number of registers as possible which are prescribed by the state of execution of the old job. Then, each of the processors sets a register save range flag 2408 (FIG. 5) to record that the minimal number of registers are saved and thereafter starts the execution of the new job.

More particularly, as has been described in connection with FIG. 13, switching of the virtual space of the new job is set in step S14042 and the assignment of data transfer areas is changed in step S14043. Further, in step Sl4044, a register save range flag of the job about to be recovered is consulted. If the register save range register flag is set, only as small a number of registers as necessary are recovered in step 14045 but if not set, all the registers are recovered in step S14046 and the new job is resumed in step S14047.

On the other hand, the processor 1008 is switched to the new job in the step S1414 in FIG. 14 in accordance with a process flow detailed in FIG. 20. More particularly, as small a number of registers as necessary are saved in step S14141 in FIG. 20, the fact that only the minimal registers are saved is set to a register save range flag in step S14142, switching of the virtual job as explained in connection with FIG. 13 is set in step S14143 and the assignment of data transfer areas is changed in step S14144. Further, in step S14145, a register save range flag of a job about to be recovered is consulted in step S14145. If the register save range flag is set, only as small a number of registers as necessary are recovered in step S14146 and the register save range flag is reset in step S14147. On the other hand, if the register save range flag is not set, all the registers are recovered in step S14148 and the new job is resumed in step S14149.

The processing by the processor 1002 in FIG. 14 will now be described.

When a parallel invocation request is made in the step S1431, the parallel invocation fails because another parallel job has already been in execution as explained in connection with FIG. 12 and the assignment of parallel processors is waited for in the step S1432. More particularly, as detailed in FIG. 21, when the parallel invocation fails in the step S1431, an invocation inhibiting interrupt is generated in step S14321. By taking this opportunity, the scheduler is invoked in step S14322, the scheduler registers an invocation request on the parallel execution waiting queue in step S14323, and the assignment of parallel processors is waited for in step S14324. The above is the outline of the operation of the scheduler invoked on the parallel processors.

Further, when switching to the new job in the steps S1404 and S1414 is carried out in FIG. 14, synchronization is made between the processors 1002 and 1005 to 1008 for invocation of parallel computing part in step S1444. When the synchronization is terminated, the processors 1005 to 1007 start the processing of the parallel computing part in step S1405, the processor 1008 starts the processing of the parallel computing part in step S1415 and the processor 1002 starts the processing of the parallel computing part in step S1433. In this manner, switching of the assignment of the parallel processors can be executed by using the scheduler invoked on the parallel processors.

Figure 22:
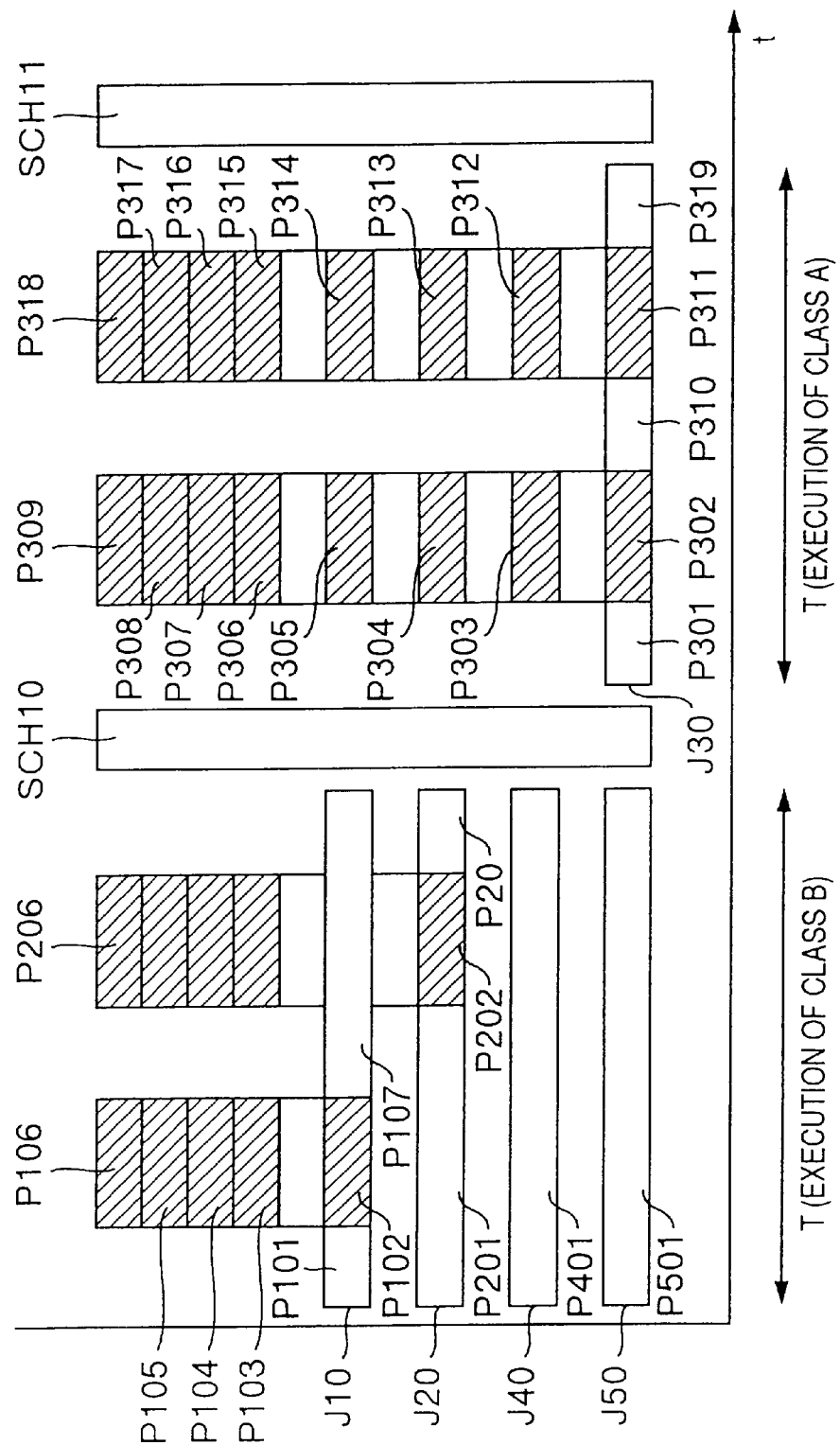
FIG. 22 is a diagram for explaining an example of dynamically changing the assignment of processors in the multiple parallel-job scheduling method according to an embodiment of the present invention.

Referring now to FIG. 22, dynamic change of the number of processors which are categorized to serial processors and the number processors which are categorized to parallel processors in the computer system in the present embodiment will be described.

FIG. 22 is a diagram for explaining an example of dynamic change of sorting of the processors in accordance with the parallel-job multiple scheduling method according to an embodiment of the present invention.

As described previously, in the present embodiment, a plurality of processors are logically categorized into serial processors and parallel processors and during an interval of time, one serial processor collectively acquires multiple processors as parallel processors so that a parallel computing part may be executed by using the serial processor and the parallel processors. The processor used as a serial processor has the same function as each of the processors used as parallel processors and they are mutually connected through equally functional units, so that the ratio of the number of processors assigned for the serial processors to that of processors assigned for the parallel processors can be changed dynamically to permit the working to be carried out in accordance with the scale of the computer resource required by an executing job. The dynamic change of the assignment number can be designated in the number ratio, the frequency and the timing on the basis of data held in the number ratio change information field 2304 (FIG. 4) in the control data 2300 in the shared memory 2000.

In an example shown in FIG. 22, the processor is caused to generate a timer interrupt each time that time T has elapsed and at the timing of this timer interrupt, the scheduler is invoked on the processor. The invoked scheduler is operated to save the state of a program executed immediately before and change the ratio of the number of processors in the computer system which are assigned for serial processors to that of processors which are assigned for parallel processors in such a way that the number ratio is decreased for the purpose of performing the batch processing frequently when the work time does not prevails. Details of the processing operation of the scheduler will be described later with reference to FIG. 23.

For example, in the computer system comprised of eight processors as shown in FIG. 9. a plurality of jobs are executed in parallel by using four of the eight processors as serial processors and the remaining four processors as parallel processors to provide a system construction which can improve the throughput of the whole of the system, or one of the eight processors is used as a serial processor and the remaining seven processors are used as parallel processors to provide a system construction which can realize the maximum performance of one job. In this manner, by switching the system construction within the same frame each time that time T has elapsed, the method of using different processors can meet various requirements.

The dynamic change of the system construction in FIG. 22 will be described more specifically.

In the computer system comprised of the eight processors shown in FIG. 9, the processors 1001 to 1008 are logically categorized into serial processors and parallel processors. It is now assumed that during execution of class B, the processors 1001 to 1004 constitute serial processors and the processors 1005 to 1008 constitute parallel processors. It is also assumed that during execution of class A, the processor 1001 constitutes a serial processor and the processors 1002 to 1008 constitute parallel processors.

A first job J10, a second job J20, a fourth job J40 and a fifth job J50 are parallel jobs which are executed in parallel. The first job J10 consists of an instruction P101 representing a serial computing part, instructions P102 to P106 representing a parallel computing part and an instruction P107 representing a serial computing part. The second job J20 consists of an instruction P201 representing a serial computing part, instructions P202 to P206 representing a parallel computing part and an instruction P207 representing a serial computing part. The fourth job J40 consists of only an instruction P401 representing a serial computing part, and the fifth job J50 consists of only an instruction P501 representing a serial computing part.

Firstly, the parallel jobs J10, J20, J40 and J50 are invoked on the serial processors 1004, 1003, 1002 and 1001, respectively. When the instruction P101 in the serial computing part of the first job J10 is terminated, the serial processor 1004 which has executed the instruction P101 in the serial computing part of the first job J10 acquires parallel processors 1005 to 1008 to proceed with the execution of the instructions P102 to P106 in the parallel computing part of the job J10.

When the instructions P102 to P106 in the parallel computing part are terminated, the serial processor 1004 starts to process the instructions P107 in the succeeding serial computing part. on the other hand, at the time that the execution of the parallel computing part of the job J10 is terminated by means of the parallel processors 1005 to 1006, the execution of the instructions P202 to P206 in the parallel computing part of the job J20 is waited for and so, the serial processor 1003 applies synchronization to the parallel processors 1005 to 1008 and consequently, the instructions P202 to P206 in the parallel computing part are subsequently executed in parallel by means of the serial processor 1003 and the parallel processors 1005 to 1008. Upon termination of the instructions P202 to P206 in the parallel computing part, each of the parallel processors 1005 to 1008 issues a termination notice and the serial processor 1003 executes the instruction P207 in the remaining serial computing part of the job J20.

On the basis of data held in the number ratio of processors setting field 2304 (FIG. 4) in the control data 2300 of the shared memory 2000, an interrupt is generated on each of the processors 1001 to 1008, for example, each time that time T has elapsed. At the timing of this interrupt, schedulers SCH10 and SCH11 are invoked on the processors 1001 to 1008 to change the construction of the system and the program to be executed in order that the ratio of the number of serial processors to that of parallel processors, that is, the assignment number is changed.

More particularly, when the execution of the class B is terminated, an interrupt is generated to start the scheduler SCH10 to ensure that the system construction can be changed in such a way that the processor 1001 behaves as a serial processor and the processors 1002 to 1008 behave as parallel processors to make the execution of the class A possible.

During the execution of the class A, a third job J30, for example, is executed. When the new job J30 is invoked, the execution of an instruction P301 in a serial computing part is invoked on the serial processor 1001. At the termination of the instruction P301 in the serial computing part, the processing of the succeeding parallel computing part is invoked and then synchronization between the serial processor 1001 and each of the parallel processors 1002 to 1008 is completed. As a result, instructions P302 to P309 in the parallel computing part are executed in parallel by means of the serial processor 1001 and the parallel processors 1002 to 1008. Further, after the parallel computation is terminated, the serial processor 1001 executes an instruction P310 in a serial computing part.

When the instruction P310 in the serial computing part is terminated and synchronization between the serial processor 1001 and each of the parallel processors 1002 to 1008 is completed upon invocation of the processing of the succeeding parallel computing part, instructions P311 to P318 in the parallel computing part are executed in parallel by means of the serial processor 1001 and the parallel processors 1002 to 1008. Further, after the parallel computation is terminated, the serial processor executes an instruction P319 in a serial computing part.

As described above, the working can be ensured in which the ratio of the number of serial processors to that of parallel processors is changed in accordance with the scale of the computer resource required by the executing job. Accordingly, the utilization of the computer system can be increased by dynamically changing the ratio between the serial computation capability and the parallel computation capability with flexibility in accordance with the quality of the executing parallel jobs, that is, the ratio of the number of serial processors to that of parallel processors.

Figure 23:
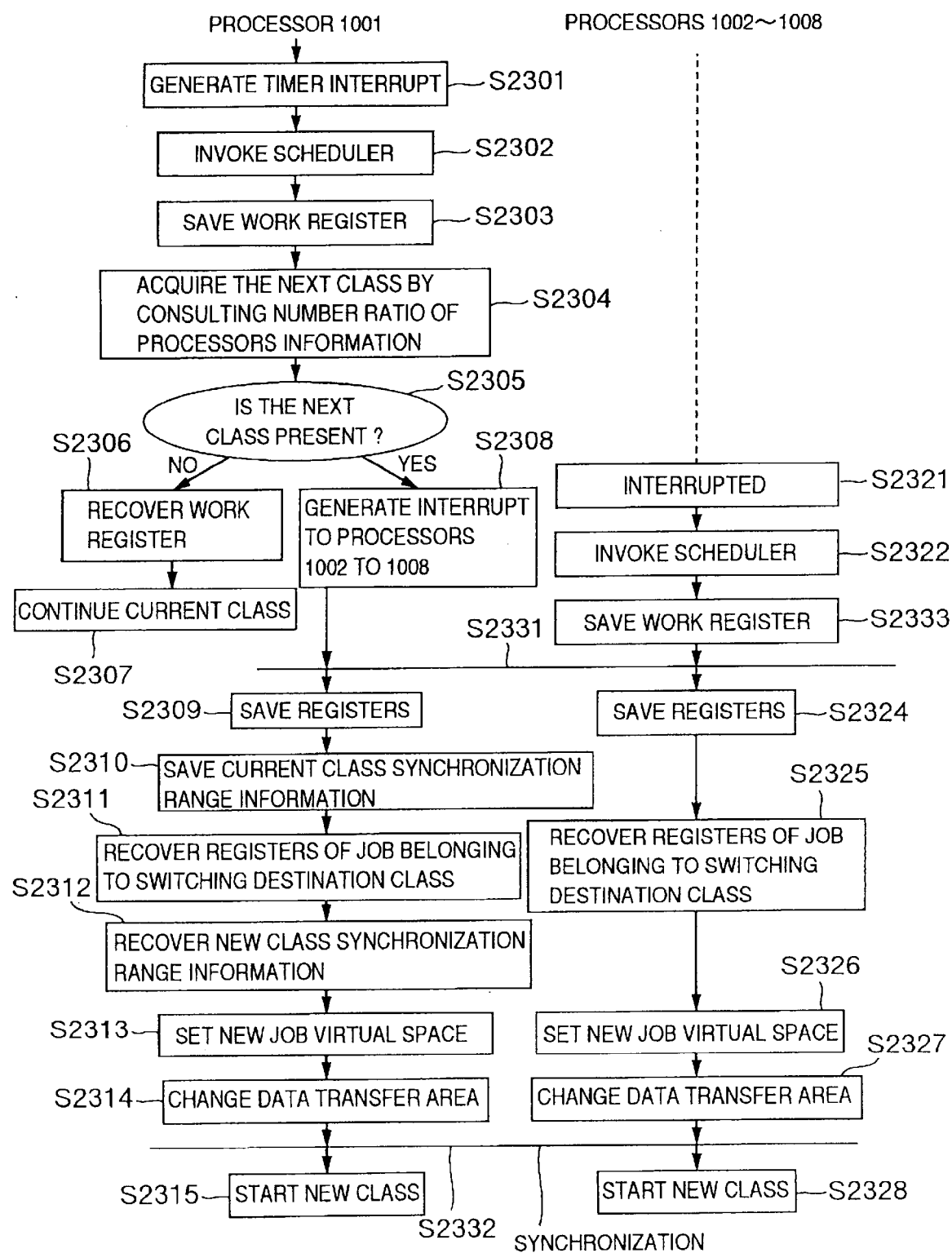
FIG. 23 is a flow chart showing the operation of the scheduler during upon job class switching in the multiple parallel-job scheduling according to an embodiment of the present invention.

Referring now to FIG. 23, the outline of the operation of the scheduler upon the job class switching in the present embodiment will be described.

FIG. 23 is a flow chart showing an embodiment of the operation of the scheduler upon the job class switching in the parallel-job multiple scheduling method.

In step S2301, a timer interrupt is generated to the serial processor 1001 in accordance with number ratio change information set to the number ratio of processors setting field 2304 (FIG. 4) of the control data 2300 in the shared memory 2000. At the timing of this interrupt, the processor 1001 invokes the scheduler SCH in step S2302.

With the scheduler SCH invoked, the processor 1001 saves the contents of the work register used in the subsequent processing in step S2303. Next, in step S2304, a switching destination class is acquired by consulting the number ratio information. The switching destination class means the class B and class A explained in connection with FIG. 22. In step S2305, it is decided whether the switching destination class exists and in the absence of the switching destination class, the work register which has been saved is recovered in step S2306 and the present class is continued in step S2307.

On the other hand, in the presence of the switching destination class, the processor 1001 issues an interrupt to the processors 1002 to 1008 in step S2308.

In the processors 1002 to 1008, on the other hand, an interrupt from the processor 1001 is generated in step S2321. The processors 1002 to 1008 in which the interrupt is generated invoke schedulers in step S2322 and save the contents of the work register used in the subsequent processing in step S2323.

Thereafter, synchronization among the processors 1001 and 1002 to 1008 is carried out in step S2331.

When the synchronization is completed, the processor 1001 saves registers in step S2309 and saves the state of the synchronization range indicator at the present class in step S2310. Thereafter, in step S2311, registers of a job belonging to a switching destination class are recovered.

Next, in step S2312, the state of the synchronization range indicator for the new job is recovered, a virtual memory mapping of job corresponding to the processor is set (14017) in step 2313 and the contents of the data transfer area is changed, in step S2314, to one which reflects the class switching.

On the other hand, each of the processors 1002 to 1008 saves registers in step S2324 and restores the register contents of the switching destination class job in step S2325. Further, a virtual memory mapping of the new job is set in step S2326 and setting of the data transfer area is changed in step S2327.

Thereafter, in step S2332, synchronization among the processors 1001 and 1002 to 1008 is carried out.

When the synchronization is completed, the processor 1001 confirms in step S2315 that all the processors are ready to execute the new class and proceed to execution of the new class. The processors 1002 to 1008 proceed to execution of the new class in step S2328.

Working of the job class switching in the present embodiment is carried out as follows. More particularly, as described previously, if the maximum speed of the computer system is desired to be realized, all the processors are required to be assigned to the job. On the other hand, even in the case of a job aiming at the maximum speed eventually, it need not occupy the whole of the computer system in the phase of debug and therefore, a plurality of debug operations are sometimes desired to proceed in parallel or a plurality of jobs are sometimes desired to be operated in parallel at the sacrifice of some impairment of the performance of one job so as to increase the utilization of the whole of the computer system.

Thus, in the present embodiment, the parallel jobs are classified in accordance with the requirements as above. On the computer system, the class is switched on the basis of the number ratio change information set in the number ratio of processors setting field 2304 (FIG. 4) and a job belonging to each class is processed in accordance with the execution system of the corresponding class within a time assigned to the corresponding class.

Further, the computer system includes a job scheduling queue (FIG. 6) for scheduling every class. A job invoked on the computer is put in the job scheduling queue of a class to which the job belongs and as soon as the order of processing of the corresponding class arrives, the job is processed.

The processing of jobs belonging to the same class is proceeded with by switching parallel processors shared by programs of the same class to a different serial processor by means of the parallel execution waiting queue (FIG. 6). How the jobs are processed within the class conforms to the definition of the class.

Returning now to FIG. 22, a working example of the job class switching described as above will be described.

In the example shown in FIG. 22, the job class is defined which is executed by the system construction wherein the parallel job occupies the whole system in class A and the four serial processors and four parallel processors are provided in class B. FIG. 22 shows the behavior of switching from the execution of class B to the execution of class A.

In FIG. 22, the four parallel jobs J10, J20, J40 and J50 belonging to the class B are processed within computing time T assigned to the class B. In the class B, the four processors are used as serial processors to execute four parallel jobs at a time. When five or more jobs are invoked simultaneously, the fifth and ensuing jobs wait for the termination of the execution of the preceding four jobs in the job scheduling queue of the class B.

The scheduler SCH10 invoked after the expiration of the time T assigned to the class B saves the state of execution of the class B and starts changing of the number ratio of processors in the system and processing of jobs belonging to the class A in order to execute the other class A.

In the class A, since only one program is processed at a time, the second and ensuing jobs invoked simultaneously waits for the termination of the job being executed in the job scheduling queue of the class A.

Similarly, when the time T assigned to the class A has elapsed, the scheduler SCH11 is again invoked to save the execution state of the class A, change the number ratio of processors in the system, recover the state of execution of the class B which has been saved previously, and resume the program.

Thereafter, different classes occurring alternately are similarly executed in a time sharing manner.

In the above description, the computing times T assigned to the classes A and B, respectively, are equal to each other but different times may be assigned to different classes. Further, in addition to the two classes A and B, a class which differs in the number ratio of processors may be provided.

Further, a plurality of classes may be prepared by using the same number ratio of processors. Further, with the same number ratio of processors, classes to which different computing times are assigned or classes for which the priority of the time assignment on the time sharing base differs may also be prepared.

The upper limit of the number of jobs to be processed at a time within one class is made to be the number of serial computation components in that class but the number of jobs in excess of the upper limit may be executed by switching the jobs in excess within the computing time assigned to the class.

Further, a system may be realized in which for example, working proceeds with the aforementioned class B in the day time and working proceeds with the class A at night by setting the time T held in the number ratio change information and the timing for switching.

Next, referring to FIG. 24, the dynamic change of the number of processors in the computer system assigned for serial processors and for parallel processors carried out at the timing for generation of the waiting state in the present embodiment, that is, scheduling will be described.

Figure 24:
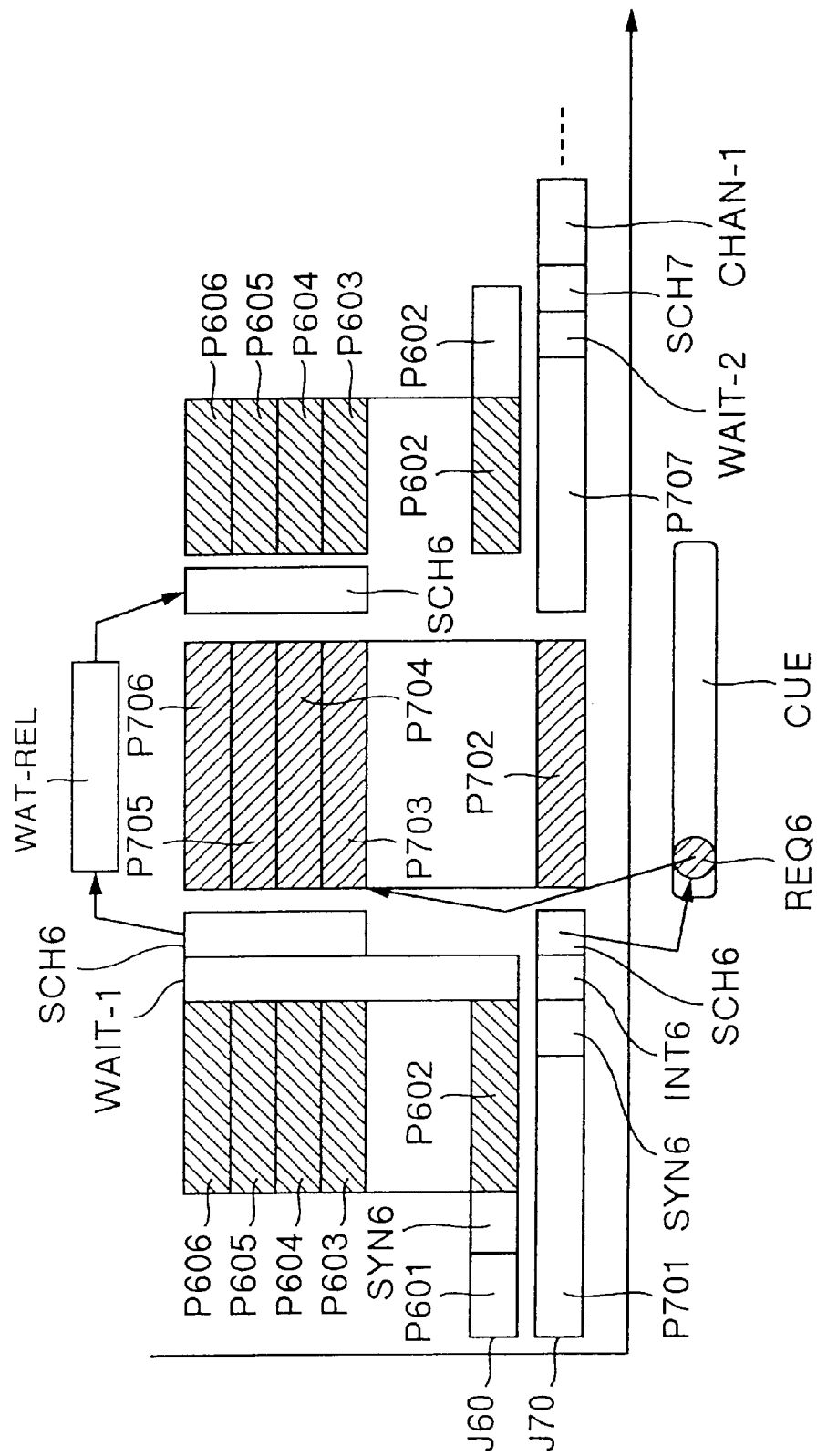
FIG. 24 is a diagram for explaining scheduling at the timing of the generation of a waiting state in the multiple parallel-job scheduling method according to an embodiment of the present invention.

FIG. 24 is a diagram for explaining an embodiment of scheduling carried out at the timing for generation of the waiting state in the parallel-job multiple scheduling method.

Each of the processors 1001 to 1008 in the computer system has, in the control data 2300 (FIG. 4) in the shared memory 2000, a waiting state flag 2310 (FIG. 4) for holding information as to whether the processor of its own is in waiting condition. When one of a plurality of processors constituting parallel processors is placed in waiting condition, it refers to the waiting state flag 2310 to examine whether other processors participating in the parallel processor group and serial processors are in waiting condition. If all the processors in the parallel processor group and serial processors are determined to be in waiting condition, the scheduler switches the assignment of the parallel computing component from the present job placed in waiting condition to another job put in the parallel execution waiting queue.

In the example shown in FIG. 24, it is assumed that the computer system comprises eight processors as shown in FIG. 9. First and second jobs J60 and J70 are parallel jobs executed in parallel. The parallel jobs J60 and J70 are invoked on the serial processors 1001 and 1002, respectively.

The two jobs J60 and J70 are started for execution and an instruction P601 of the job J60 and an instruction P701 of the job J70 are executed. When the instruction P601 of the job J60 is terminated and instructions P602 to P606 in a parallel computing part are reached, synchronization SYN6 is made and the instructions P602 to P606 in the parallel computing part are executed by using the processor 1001 and processors 1005 to 1008.

On the other hand, when the job J70 invokes a parallel computing part at invocation SYN6 while the instructions P602 to P606 in the parallel computing part of the job J60 being executed, an interrupt INT6 is generated because the different parallel job is in execution. At the timing of this interrupt INT6, the scheduler SCH6 in the shared memory 2000 is invoked, so that a parallel process request REQ6 is put in the parallel execution waiting queue CUE and assignment of parallel processors is waited for.

Under this state, all the processors 1005 to 1008 constituting the parallel processor group and the processor 1001 read/write, for example, a disc to establish a waiting state WAIT-1. Then, the scheduler SCH6 takes out the parallel execution request REQ6 for the job J70 from the parallel execution waiting queue CUE. Details of the processing by the scheduler SCH6 will be described later with reference to FIG. 25.

The parallel processors 1005 to 1008 are then assigned to the job J70 which has been in parallel execution waiting condition and the execution of instructions P702 to P706 in a parallel computing part of the job J70 is started.

When an event WAT-REL for causing the waiting state is terminated to release the waiting state of the job J60, the scheduler SCH6 again assigns the parallel processors to the job J60 after having waited for the termination of the parallel job J70 in execution and resumes the instructions P602 to P606 which succeed the waiting state. As soon as the instructions P602 to P606 in the parallel computing part of the job J60 are terminated, the processor 1001 starts to execute an instruction 607 in the succeeding serial computing part of the job J60.

As soon as the instructions P702 to P706 in the parallel computing part of the job J70 are terminated, the processor 1002 starts to execute an instruction P707 in the succeeding serial computing part of the job J70.

In the manner described as above, the scheduling is carried out at the timing for generation of the waiting state on the parallel processors.

Referring again to FIG. 24, a method for scheduling carried out at the timing for generation of the waiting state on the serial processor will be described.

When the waiting state is established on the serial processor, the assignment of the serial processor is switched to a serial computing part of another job if the parallel computing part of the job in which the waiting state has occurred is not processed on the parallel processors.

More particularly, in FIG. 24, the job J70 on the processor 1002 is placed in waiting condition WAIT-2 while the instruction P707 in the serial computing part of the job J70 being executed and at that time, no parallel computing part of the job J70 is executed on the parallel processors 1005 to 1008. Then, on the processor 1002, the scheduler SCH7 performs switching CHAN-1 to a serial computing part of another job.

In this manner, the scheduling can be carried out at the timing of generation of the waiting state on the serial processor.

Figure 25:
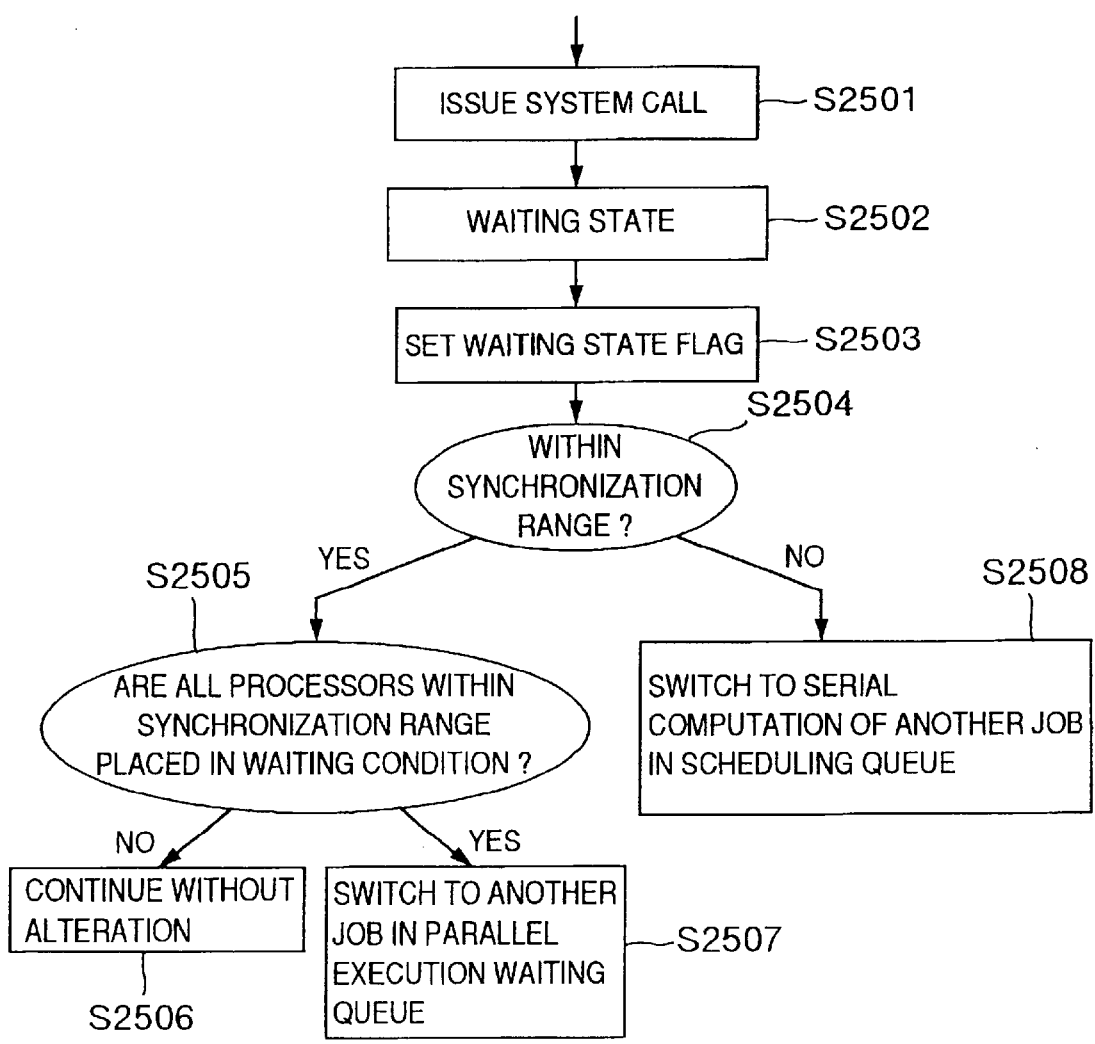
FIG. 25 is a flow chart for explaining the processing of scheduling due to the generation of a waiting state in the multiple parallel-job scheduling method according to an embodiment of the present invention.

Referring now to FIG. 25, the processing operation by the processor when the scheduling is carried out at the timing of the generation of the waiting state in the present embodiment will be described.

FIG. 25 is a flow chart for explaining an embodiment of the processing of the scheduling due to the generation of the waiting state in the multiple parallel-job scheduling method.

In step S2501 in FIG. 25, a system call is issued, for example, under the waiting state after an I/O instruction is issued and the waiting state is generated in step S2502. Next, in step S2503, the scheduler SCH is invoked and a waiting state flag is set.

Now, in step S2504, it is decided whether the processor for which the waiting state flag is set is within the synchronization range and if within the synchronization range, it is decided in step S2505 whether all processors in the synchronization range are placed in waiting condition. If another processor is not placed in waiting condition, the program proceeds without alteration in step S2506. When all processors within another synchronization range of the parallel execution waiting are placed in waiting condition, the job is switched to another job in parallel execution waiting in step S2507. Namely, in the example shown in FIG. 24, the job J60 is placed in waiting condition and the job is switched to the job J70.

If it is determined in the step S2504 that the processor placed in waiting condition is not within the synchronization range, that is, the processor is a serial processor assigned to a different job in which the parallel computing part is not in execution, switching to a serial computing part of the different job in the scheduling queue is effected in step S2508. Namely, in the example shown in FIG. 24, the job J70 is placed in waiting condition and switched to another job.

Figure 26:
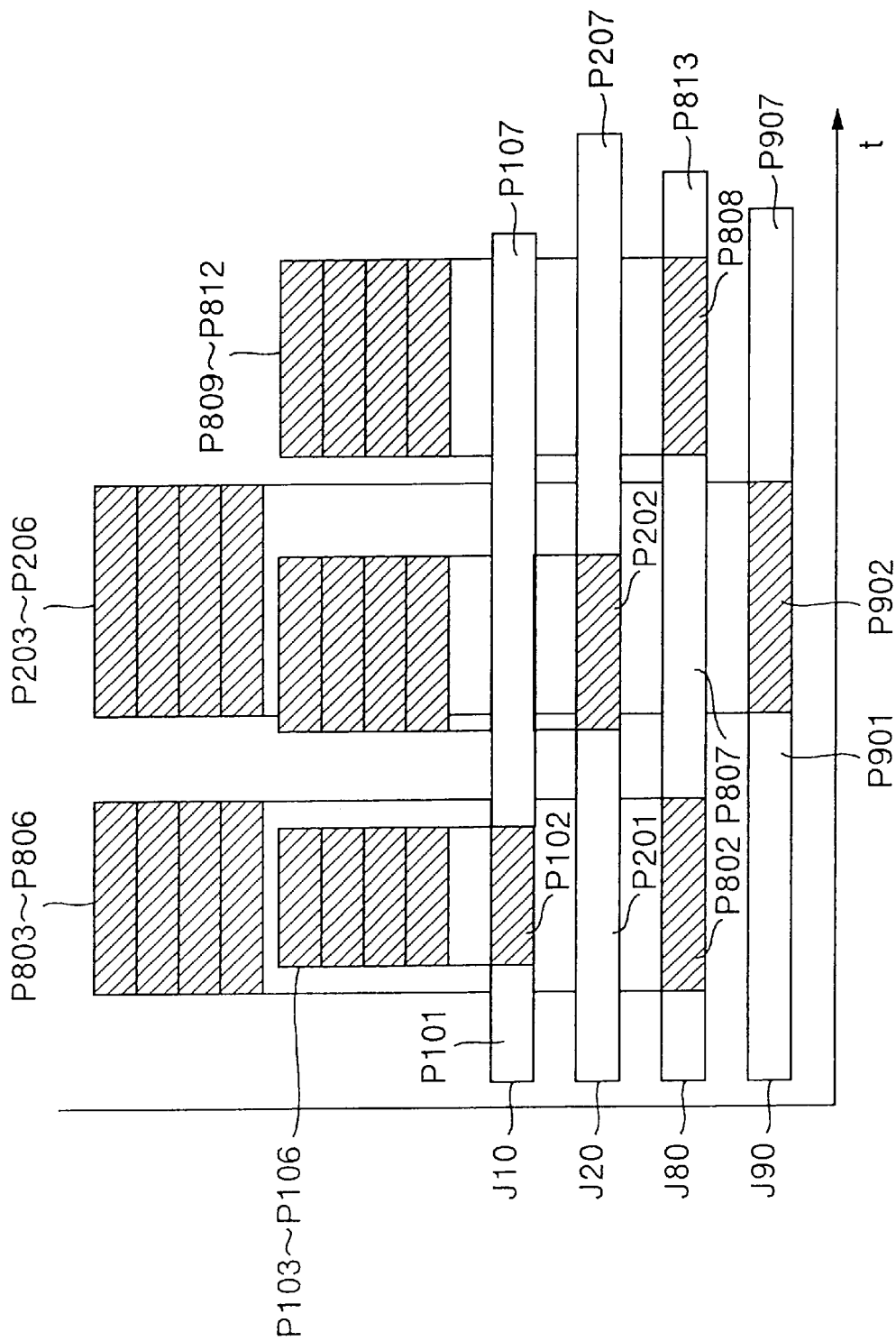
FIG. 26 is a diagram for explaining the operation of a computer system comprising a plurality of parallel processor groups in the multiple parallel-job scheduling apparatus according to an embodiment of the present invention.

Referring now to FIG. 26, the operation of the computer system comprising a plurality of parallel processor groups in the present embodiment will be described.

FIG. 26 is a diagram for explaining an embodiment of the operation of the computer system comprising the plurality of parallel processor groups in the parallel-job multiple scheduling system.

In the present embodiment, the computer system is described as comprising twelve processors 1001 to 1012. The four processors 1001 to 1004 constitute serial processors, the four processors 1005 to 1008 constitute a first parallel processor group, and the processors 1009 to 1012 constitute a second parallel processor group.

On the four serial processors 1001 to 1004, four jobs J10, J20, J80 and J90 are invoked to execute instructions P101, P201, P801 and P901, respectively. The job J80 firstly reaches a parallel computing part and firstly acquires the first parallel processors 1005 to 1008 to start execution of instructions P802 to P806 in the parallel computing part. The job J10 secondly reaches a parallel computing part and acquires the second parallel processors 1009 to 1012 to start execution of instructions P102 to P106 in the parallel computing part of this job in parallel with the instructions P802 to P806 in the parallel computing part of the job J80.

When only one parallel processor group is provided, the register bit of the synchronization range indicating register 4110 in the synchronization rang indicator 4100 is made to correspond to the processor as shown in FIG. 2 so as to control the indication of the synchronization range and the permission/inhibition of the use of the parallel processor group by the serial processor. But in the environment in which a plurality of parallel processor groups are provided, a synchronization range indicating register for indicating/ controlling the affinity of the serial processors with the parallel processors has bits by the number meeting the number of all the processors. Upon invocation of a job, the OS assigns parallel processors and a serial processor to the job and in connection with the assigned parallel processors, sets for the job specific identifiers indicative of the parallel processors at positions of the synchronization range indicating register corresponding to the respective parallel/serial processors. A bit corresponding to a processor not assigned to a job is set with "0". It is possible to use the respective parallel/serial processors set at the positions of the synchronization range indicating register corresponding to themselves. In synchronization upon invocation of parallel computing part, it is decided by a value of this bit whether the synchronization continues or an interrupt is generated to invoke the scheduler so as to register a parallel execution request on the parallel execution waiting queue. Even when the assignment of the parallel processors is changed, the issuance of the synchronization can always be effected by the same instruction and so the program need not be recompiled upon the assignment. Accordingly, the degree of freedom of the assignment of parallel processors is high.

Here, by making reference to FIG. 28, the construction of the synchronization range indicating register will be described.

Figure 28:
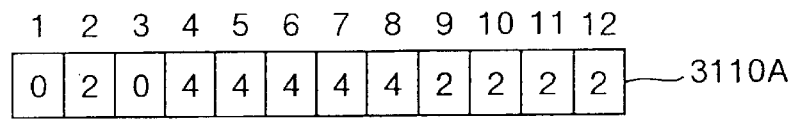
FIG. 28 is a flow chart for explaining synchronization based on software in the parallel-job multiple scheduling method according to an embodiment of the present invention.

FIG. 28 is a diagram showing an embodiment of the construction of the synchronization range indicating register in the computer system comprising a plurality of parallel processor groups.

In the computer system comprising twelve processors, a synchronization range indicating register 3110A has 12 bits. In order to indicate that the job J20 on the serial processor 1002 is assigned with the processors 1009 to 1012 constituting the second parallel processor group, "2" is set to the second and ninth to twelfth bits of the synchronization range indicating register 3110A. In order to indicate that the job J90 on the serial processor 1004 is assigned with the processors 1005 to 1008 constituting the first parallel processor group, "4" is set to the fourth and fifth to eighth bits. The first and third bits of the synchronization range indicating register 3110A corresponding to the processors 1001 and 1003 which are now inhibited from using the parallel processor sets are set with "0".

When the execution of the instructions P102 to P106 in the parallel computing part of the job J10 on the serial processor 1001 is completed, the instructions P202 to P206 in the parallel computing part of the job J20 subsequently invoked are processed by the second parallel processors 1009 to 1012. On the other hand, in the first parallel processors, the execution of instructions P902 to P906 in a parallel computing part of the job J90 invoked after the termination of the processing by the job J80 is started.

After the termination of the processing as above, the execution of instructions P802 to P812 in a parallel computing part of the job J80 is started. In the job J80, the instructions P802 to P806 in the one preceding parallel computing part have been executed by the first parallel processors but in the same job, the succeeding parallel computing part may be assigned with a different parallel processor group from that assigned to the previous parallel computing part.

While in the aforementioned example the synchronization between the processors is effected using the dedicated hardware, the function is realized on software base according to an embodiment of the present invention.

More particularly, instead of holding the barrier synchronizer, each of the processors includes a synchronization point arrival flag 2309 (FIG. 4) corresponding to each processor on the shared memory 2000. A processor reaching the synchronization point makes a request for synchronization by setting the synchronization point arrival flag 2309. At a time point that the synchronization point arrival flags 2309 of all processors are set, completion of the synchronization is detected on software base.

In place of the synchronization range indicator 4100, a synchronization range indicating field 2307 (FIG. 4) is provided on the shared memory 2000 and by registering a processor within the synchronization range on the synchronization range indicating field 2307, the synchronization range can be indicated on software base. When making a synchronization request, each processor decides in accordance with the contents of the synchronization range indicating field 2307 whether this processor is within the range of synchronization. If within the synchronization range, each processor continues the synchronization without alteration but if outside the synchronization range, it generates an interrupt on the processor for execution of its own. Further, when the processor determined to be within the synchronization range makes a synchronization request and sets synchronization range indicator, through the program, such that this processor is outside the synchronization range during an interval between making the request and establishment of the synchronization, that processor which has effected the setting generates an interrupt to a processor which is newly indicated to be outside the synchronization range. In this manner, the function of the synchronization range indicator 4100 is realized in a hardware fashion but this may be realized in a software fashion.

The synchronization timeout component can also be realized in a software fashion. A processor reaching the synchronization does not wait infinitely before another processor within the synchronization range reaches the synchronization but it recognizes a failure of synchronization when a processor exists which does not reach the synchronization at the termination of a predetermined time and causes the processor within the synchronization range to generate an interrupt which in turn invokes the scheduler to carry out the error processing.

Figure 27:
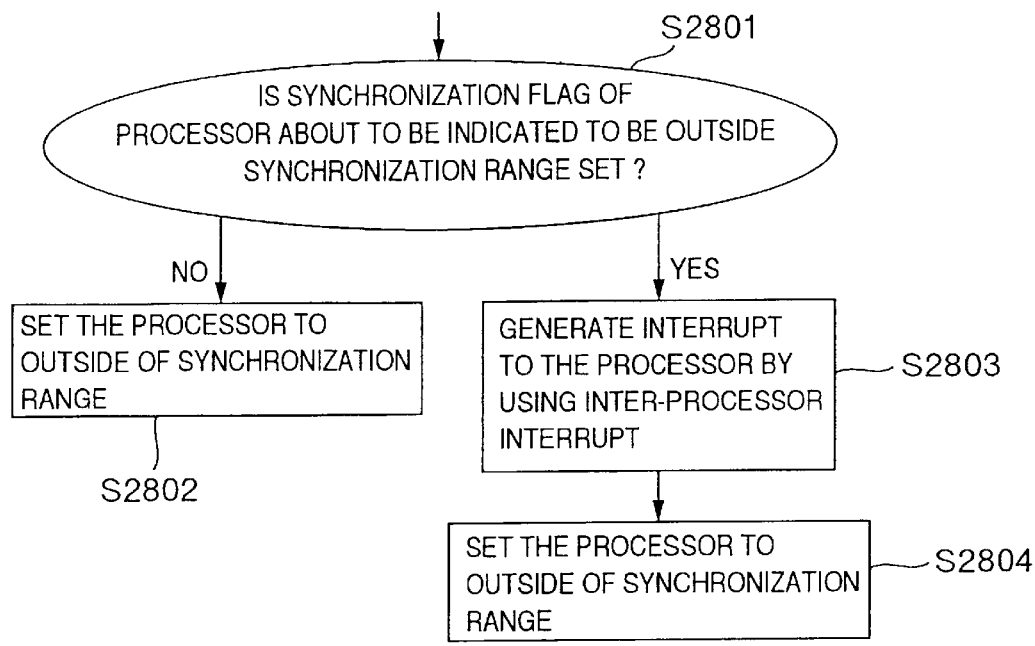
FIG. 27 is a diagram showing the structure of a synchronization range indicating register in the computer system comprising the plurality of parallel processor groups according to an embodiment of the present invention.

When a processor within the synchronization range is desired to be so reset as to be outside the synchronization range in the step S2801 in FIG. 27, the processor is checked as to whether it sets a synchronization flag. If not set, the processor is set to be outside the synchronization range without alteration in the step S2802. On the other hand, if the flag is set, the processor is caused to generate an interprocessor interrupt in the step S2803. A processor receiving the interrupt invokes the scheduler in the step S2804 so that a job executed on the processor may be registered on the parallel execution waiting queue and at the same time, the processor may be set to be outside the synchronization range.

Figure 29:
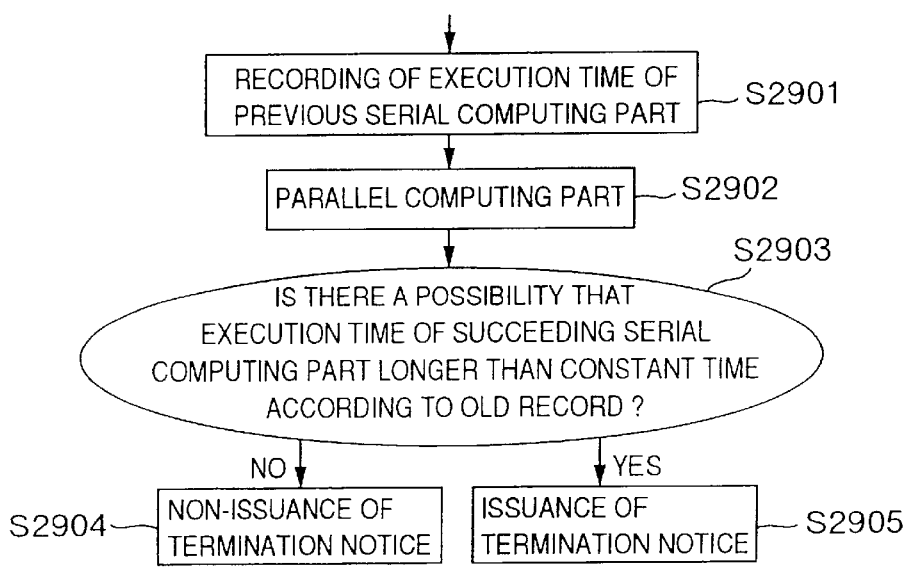
FIG. 29 is a flow chart showing the dynamic decision processing of a termination notice in the multiple parallel-job scheduling method according to an embodiment of the present invention.

Referring now to FIG. 29, a method of issuing a termination notice on the basis of a dynamic decision will be described.

FIG. 29 is a flow chart showing an embodiment of the processing of dynamically deciding the termination notice in the parallel jobs multiple scheduling method.

Static issuance of a termination notice is carried out by automatically analyzing the executing time of the succeeding serial computing part by means of the compiler and issuing the termination notice.

The successfulness of application of the present system depends on how often the termination notice is issued upon the termination of one parallel processing to effect switching of an executing job on parallel processors having low overhead of save and recovery. When it is clear from the structure of program in advance upon the termination of the parallel computation that the succeeding serial computing part is long so that the termination notice may be issued in as many cases as possible, the user can execute an instruction for dynamically issuing the termination notice to expedite changing of the assignment of the parallel processors.

In the present embodiment, when the execution proceeds, the executing times of a parallel computing part and a serial computing part are recorded on the previous serial computing part information field 2405 (FIG. 5) in the control data 2400 on the shared memory and statistical analysis is applied on the basis of the data. As a result, the processing based on the dynamic analysis during execution is executed wherein when it is determined that there is a probability that the executing time of a serial computing part following one parallel computing part is longer than a constant time, the scheduler automatically issues a termination notice.

In step S2901 in FIG. 29, the executing time of the preceding serial computing part is stored in the previous serial computing part information field 2405 (FIG. 5) newly included in the job control data 2400 in the shared memory 2000. Subsequently, in step S2902, the processor executes the processing of a parallel computing part.

In step S2903, the scheduler decides, at the termination of the parallel computing part, on the basis of the contents of the previous serial computing part information field 2405 whether the executing time of the succeeding serial computing part is longer than the constant time. If determined to be longer, a termination notice is issued in step S2904 but if determined to be shorter, the termination notice is prevented from being issued in step S2905.

The executing times of all serial computing parts occurring over an interval of from the beginning of the execution of one parallel job to the termination thereof need not be recorded. A certain constant A is defined and a history of the executing times of A serial computing parts is held and decision can be made on the basis of the history. For example, when a parallel computing part exists repetitively, the parallel computing part occurs periodically during the execution by the number of repetitions. It is now assumed that in spite of the fact that the executing time of a serial computing part between the parallel computing parts is longer than the constant time, a code for issuing a termination notice is not generated upon the termination. Then, the parallel computing part executed repeatedly can issue a termination notice upon the termination by consulting the history of the past A frequencies.

In the present embodiment, even when the issuance of the termination notice due to the static analysis by the compiler is difficult to achieve, the assignment of the parallel processors can be changed by dynamically issuing a termination notice.

Next, an execution method when the executing job is only one in the present embodiment will be described with reference to FIGS. 30 and 31.

FIG. 30 is a flow chart showing an embodiment of the operation at the time that the register is saved when the job is singularly executed in the parallel-job multiple scheduling method, and FIG. 31 is a flow chart showing an embodiment of the operation at the time that the register is recovered when the job is singularly executed in the parallel-job multiple scheduling method.

Under the condition that only one job is executed, the processing for multiple execution of parallel jobs can all be omitted. In the foregoing description, save/recovery of as small a number of registers as possible can be effected during invocation and termination of a parallel computing part by setting the register save range flag 2408 (FIG. 5). But when the job to be executed in the computer system is one, even the save/recovery of the minimal number of registers is unnecessary.

In order to detect a condition that the job to be executed is one, the computer system includes a job single execution flag 2308 (FIG. 4) and when the number of executing jobs changes to 1 (one) concomitantly with invocation and termination of job, the scheduler sets the job single execution flag. When it is indicated that the job number in execution is one by consulting the job single execution flag, the contents of registers of parallel processors is not saved/recovered and scheduling of the parallel processors can be accomplished without causing any overhead for multiple execution of parallel jobs.

Firstly, the save processing of register will be described with reference to FIG. 30.

When the scheduler switches the job on parallel processors following the issuance of a termination notice, it examines in step S3001 whether a job single execution flag 2308 (FIG. 4) is set. If set, the register is not saved in step S3002 and the fact that the register is not used is recorded by setting a register unsaving flag 2407 (FIG. 5) in the job control data.

When the single execution flag is not set, only as small a prescribed number of registers as possible are saved in step S3004 and the fact that only the minimal number of registers are saved is recorded by setting a register save range flag 2408 (FIG. 5).

Next, the recover processing of registers will be described with reference to FIG. 31.

In step S3101, the scheduler examines whether the job single execution flag 2308 (FIG. 4) is set. If set, the registers is not recovered in step S3102 and the register unsaving flag 2407 (FIG. 5) in the job control data is released in step S3103.

If the single execution flag is not set, it is examined in step S3104 whether a register save range flag 2408 (FIG. 5) of a switching destination new job is set. If set, only necessary registers are recovered in step S3105 and besides, in step S3106, a register save range flag 2408 of the new job is released. If not set, all registers are recovered in step S3107.

As described above, according to the present embodiment, unless a plurality of jobs execute parallel computing parts at a time, parallel registers being idle during execution of a serial computing part of one job can be assigned to the execution of a parallel computing part of another job and therefore, the plurality of jobs can be executed in parallel, thereby increasing the utilization of all processors in the computer system.

Being different from the conventional parallel computation dedicated component, processors are logically categorized into serial processors and parallel processors and the parallel processors for execution of the parallel computing part are equally functional to the serial processors and hence, the ratio of the number of processors in the computer system assigned for the serial processors to that assigned for the parallel processors can be changed dynamically. Accordingly, the number ratio of processors in the computer system can be changed in accordance with the ratio between serial computing part and parallel computing part in a job to be executed, thus increasing the utilization of the computer system.

Further, the parallel computation by processors within the synchronization range is executed by using the synchronization range indicator. In response to a synchronization request from a processor outside the synchronization range, an interrupt is generated on the request originating processor and an interrupt is generated on a processor which is so reset as to be outside the synchronization range before establishment of the synchronization so that the scheduler may be invoked to set up a waiting state and an invocation request may be put in the parallel execution waiting queue. Consequently, during a certain interval, parallel processors can easily be assigned to one serial processor.

By causing a synchronization point arrival instruction executed upon invocation of a parallel computing part to examine a bit of the register in the synchronization range indicator corresponding to a processor which executes the synchronization point arrival instruction, the processing can be carried out in accordance with sorting of the modes as to whether this processor can use parallel processors and so the parallel processors can be assigned exclusively.

Further, upon the termination of the processing of the parallel computing part, parallel processors issue termination notices and responsive thereto, switching is effected to the execution of a parallel computing part of another parallel execution waiting job. In this phase, since the execution of the parallel computing part is terminated, save of registers of the parallel processors can be reduced greatly to realize switching of less overhead. Accordingly, the job can be changed at a high speed.

The termination notice is issued only when the executing time of the succeeding serial computing part is longer than a constant time. Consequently, switching of parallel processors can be effected only when the time for serial computing in one parallel job is long enough to execute a parallel computing part of a different parallel job and the parallel computing part of the different parallel job can be assigned during an idle time of the parallel processors, thus ensuring that the overhead of scheduling can be decreased and the utilization of the whole of the computer system can be improved.

Further, since the scheduler is invoked on only the parallel processors to perform the processing of job switching, the job switching can be carried out without affecting the execution of the processing of a serial computing part of another job to shield the overhead of the job switching.

By using the termination of a parallel computing part as the timing for assignment switching of parallel processors, the job can be switched at a good timing to greatly reduce the number of registers to be saved/recovered, thereby reducing the overhead of the job switching.

The synchronization timeout register is used and when a parallel processor exists which does not reach the synchronization point within a predetermined time, the synchronization is considered to be failed and an interrupt informing the synchronization failure is generated on the processor. Responsive to the interrupt, the scheduler is invoked to carry out the error processing.

Upon switching the job, the inter-processor data transfer areas are prepared on the real address space, these areas are made to correspond to the same addresses on a virtual address space by using the inter-processor data transfer area assignment field. Thus, upon the job switching, the assignment between the real and virtual addresses can be changed to make save/recovery of the state of the inter-processor data transfer areas unnecessary, so that the assignment change of the parallel computing component can be effected at a high speed.

Further, parallel jobs are classified, the class can be switched on the basis of the number ratio of processors information set on the number ratio of processors information setting field, and jobs belonging to the respective classes can be processed within times assigned to the respective classes in accordance with the execution systems of the respective classes.

The job scheduling queue for scheduling is provided for each class and a job is put in a job scheduling queue of a class to which this job belongs, with the result that the computation can be carried out every class in the order of computation.

Jobs belonging to the same class can be allowed to proceed by switching parallel processors shared by programs of the same class by means of the parallel execution waiting queue.

At the timing of generation of a waiting state on the parallel processors, scheduling for job switching can be executed.

By providing a plurality of parallel processor groups, a plurality of parallel computing parts can be executed in parallel.

The synchronization between processors can be realized in a software fashion.

When it is clear in advance from the structure of the program that upon termination of a parallel computing part, the succeeding serial computing part is longer, the assignment of the parallel processors can be changed by issuing a dynamic termination notice.

We claim:

1. A scheduling method of performing scheduling of execution of a plurality of jobs each including a serial computing part and a parallel computing part in a system having a plurality of processors, comprising the steps of:

indicating, in said plurality of processors, a first serial processor for executing a serial computing part and a parallel computing part of a first job and a plurality of first parallel processors for executing the parallel computing part of said first job in parallel, said plurality of parallel processors including said first serial processor;

indicating, in said plurality of processors, a second serial processor, other than said first serial processor, for executing a serial computing part and a parallel computing part of a second job executed in parallel with said first job and a plurality of second parallel processors for executing the parallel computing part of said second job, said plurality of second parallel processors including said second serial processor and at least one of said plurality of first parallel processors; and scheduling the execution of jobs such that during the execution of said parallel computing part of said first job in said plurality of first parallel processors, said serial computing part of said second job in said second serial processor is executed.

2. A scheduling method according to claim 1, wherein said schedule step includes:

generating an interrupt signal during the execution of said first job when said second serial processor issues a request for using said plurality of second processors in order to execute said parallel computing part of said second job; and after the generation of said interrupt, suspending the execution of said parallel computing part of said second job during the execution of said parallel computing part of said first job by said plurality of first parallel processors.

3. A scheduling method according to claim 2 further comprising the steps of:

when a predetermined job scheduling event occurs, forbidding the execution of said parallel computing part of said first job by said first parallel processor in order to permit the execution of said parallel computing part of said suspended second job; and when said predetermined scheduling event occurs, permitting the execution of said parallel computing part of said suspended second job and executing said parallel computing part of said second job in said plurality of second parallel processors.

4. A scheduling method according to claim 3 further comprising the steps of:

issuing a termination notice when the execution of said parallel computing part of said first job in said plurality of first parallel processors is terminated;

detecting that the executing time of a serial computing part in any of the processors which succeeds the termination of the execution of said parallel computing part of said first job in said plurality of first parallel processors is greatly longer than the executing time of a parallel computing part of a suspended job;

notifying in response to the detection in said detecting step to provide a job switching signal as said predetermined job scheduling event; and after the execution of said parallel computing part of said first job, resuming the execution of said serial computing part of said first job in said any of the processors.

5. A scheduling method according to claim 3 further comprising the steps of:

issuing a termination notice when the execution of said parallel computing part of said first job in said plurality of first parallel processors is terminated;

detecting that the execution of said serial computing part of said first job which succeeds the termination of the execution of said parallel computing part of said first job in said plurality of parallel processors is longer that a predetermined time; and notifying in response to the detection in said detecting step to provide a job switching signal as said predetermined job scheduling event.

6. A scheduling method according to claim 3 further comprising the steps of:

when a job to be executed in said system having said plurality of processors is compiled, classifying said job on the basis of information indicating how many processors are used to execute a parallel computing part of said job; and determining that a job determined, as a result of said classifying step, to have a parallel computing part executed by processors which exceeds in number a predetermined value is not executed within a predetermined work time.

7. A scheduling method according to claim 6 further comprising the step of:

setting said predetermined work time to the time in the daytime of days excepting holidays, Saturday and Sundays.

8. A scheduling method for scheduling for the purpose of executing a plurality of jobs each including a serial computing part and a parallel computing part in a system having a plurality of processors, comprising the steps of:

indicating, in said plurality of processors, a first serial processor for executing a serial computing part and a parallel computing part of a first job and a plurality of first parallel processors for executing the parallel computing part of said first job in parallel, said plurality of first parallel processors including said first serial processor;

indicating, in said plurality of processors, a second serial processor, other than said first serial processor, for executing a serial computing part and a parallel computing part of a second job which are executed in parallel with said first job and a plurality of second parallel processors for executing a parallel computing part of said second job, said plurality of second parallel processors including said second serial processor and at least one of said plurality of first parallel processors;

waiting for synchronization before the execution of said parallel computing part of said first job in said plurality of first parallel processors is started;

when said plurality of first parallel processors terminates the execution of said parallel computing part of said first job, executing a synchronization instruction; and when the execution of said parallel computing part of said first job in said plurality of first parallel processors is terminated, issuing a synchronization instruction to permit the execution of said parallel computing part of said second job in said plurality of second parallel processors.

9. A scheduling method according to claim 8 further comprising the steps of:

examining the number of processors required by a job by using an operating system and a compiler; and in advance of the execution of the job, setting flags indicating that said required processors are objects of the synchronization instruction.

10. A parallel-job scheduling method for scheduling a computer system having a plurality of processors each having the equal function so that they can be operated even when they are indicated so as to behave as either a serial processor or a parallel processor, a shared memory accessible from any of said plurality of processors, and a barrier synchronizer capable of establishing synchronization between desired ones of said processors, in which an object file of a job which said system is caused to execute is indicated to an operating system (OS) on the basis of a user input, said OS examines said object file to acquire the number of processors necessary for parallel execution when the job to be executed is a parallel computing job, said OS categorizes and indicates said processors into a parallel processor group for execution of only a parallel computing part of said job and a serial processor group for execution of a serial computing part and the parallel computing part when the job is about to be executed, said OS assigns said parallel processor group and one processor selected from said serial processor group to the job to be executed, said OS informs said barrier synchronizer that a plurality of assigned processors form one group, and said OS starts the execution of the job, wherein said job performs the execution of the serial computing part on a serial processor selected from said serial processor group, the barrier synchronization is waited for in said parallel processor group, synchronization is established between said parallel processor group and said serial processor on the basis of a barrier synchronization instruction by said serial processor when the execution proceeds to the parallel computing part, said parallel computing part is executed synchronously on said plurality of processors, a barrier synchronization instruction is again issued from said OS at the end of said parallel computing part, and the succeeding serial computing part is started synchronously.

* * * * *